US012803098B2

(12) United States Patent
Choi et al.

(10) Patent No.: US 12,803,098 B2
(45) Date of Patent: Nov. 17, 2026

(54) BATTERY PACK

(71) Applicant: LG ENERGY SOLUTION, LTD., Seoul (KR)

(72) Inventors: Byung-Hyuk Choi, Daejeon (KR); Jong-Chan Shin, Daejeon (KR); Ki-Youn Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 578 days.

(21) Appl. No.: 18/282,753

(22) PCT Filed: Dec. 21, 2022

(86) PCT No.: PCT/KR2022/021005
§ 371 (c)(1),
(2) Date: Sep. 18, 2023

(87) PCT Pub. No.: WO2023/128463
PCT Pub. Date: Jul. 6, 2023

(65) Prior Publication Data

US 2024/0162549 A1 May 16, 2024

(30) Foreign Application Priority Data

Dec. 27, 2021 (KR) ........................ 10-2021-0188346

(51) Int. Cl.
*H01M 50/258* (2021.01)
*H01M 50/204* (2021.01)
(Continued)

(52) U.S. Cl.
CPC ....... *H01M 50/258* (2021.01); *H01M 50/204* (2021.01); *H01M 50/251* (2021.01); *H01M 50/267* (2021.01); *H01M 50/289* (2021.01)

(58) Field of Classification Search
None
See application file for complete search history.

(56) References Cited

U.S. PATENT DOCUMENTS 7,563,137 B1 7/2009 Koetting et al.
8,420,250 B2 4/2013 Kim et al.
(Continued)

FOREIGN PATENT DOCUMENTS

CN 204375820 U 6/2015
CN 108878704 A 11/2018
(Continued)

OTHER PUBLICATIONS

International Search Report for PCT/KR2022/021005 (PCT/ISA/210) mailed on Mar. 29, 2023.
(Continued)

*Primary Examiner* — Carlos Barcena
(74) *Attorney, Agent, or Firm* — Birch, Stewart, Kolasch & Birch, LLP

(57) ABSTRACT

The battery pack includes a battery module; a processing unit which is electrically connected to the battery module and configured to control charge/discharge of the battery module, wherein at least one of the battery module or the processing unit is configured to allow another battery module or another processing unit to be coupled to two or more sides thereof.

17 Claims, 37 Drawing Sheets

(51) Int. Cl.

| | |
|---|---|
| ***H01M 50/251*** | (2021.01) |
| ***H01M 50/267*** | (2021.01) |
| ***H01M 50/289*** | (2021.01) |

(56) References Cited

U.S. PATENT DOCUMENTS

| | | | |
|---|---|---|---|
| 8,447,052 B2 | 5/2013 | Lee et al. | |
| 8,910,804 B2 | 12/2014 | Kim et al. | |
| 10,011,160 B2 | 7/2018 | Mitani et al. | |
| 10,020,547 B2 * | 7/2018 | Eom | H01M 10/48 |
| 10,096,872 B2 | 10/2018 | Nakano et al. | |
| 10,476,058 B2 | 11/2019 | Kim et al. | |
| 10,804,510 B2 | 10/2020 | Lee et al. | |
| 11,223,085 B2 | 1/2022 | Choi et al. | |
| 2010/0151299 A1 | 6/2010 | Ha et al. | |
| 2012/0003505 A1 | 1/2012 | Kim | |
| 2015/0064541 A1 | 3/2015 | Noh et al. | |
| 2016/0104873 A1 | 4/2016 | Smythe | |
| 2016/0218334 A1 | 7/2016 | Whitacre et al. | |
| 2020/0044213 A1 | 2/2020 | Park et al. | |
| 2022/0037701 A1 | 2/2022 | Kim | |
| 2022/0255145 A1 | 8/2022 | Lee et al. | |
| 2022/0399578 A1 | 12/2022 | Lee et al. | |
| 2023/0112307 A1 | 4/2023 | Seo et al. | |
| 2024/0304929 A1 | 9/2024 | Shin et al. | |

FOREIGN PATENT DOCUMENTS

| | | | |
|---|---|---|---|
| CN | 109891626 | A | 6/2019 |
| CN | 211980725 | U | 11/2020 |
| CN | 113745733 | A | 12/2021 |
| EP | 2 064 758 | B1 | 9/2014 |
| EP | 3 809 486 | A1 | 4/2021 |
| EP | 4 290 656 | A1 | 12/2023 |
| JP | 2003-7257 | A | 1/2003 |
| JP | 2007-26755 | A | 2/2007 |
| JP | 2010-15985 | A | 1/2010 |
| JP | 2011-119222 | A | 6/2011 |
| JP | 2012-79512 | A | 4/2012 |
| JP | 2012-119220 | A | 6/2012 |
| JP | 2014-107241 | A | 6/2014 |
| JP | 5601960 | B2 | 10/2014 |
| JP | 2016-18608 | A | 2/2016 |
| JP | 2016-152133 | A | 8/2016 |
| JP | 2017-77786 | A | 4/2017 |
| JP | 2017-79148 | A | 4/2017 |
| JP | 2019-514177 | A | 5/2019 |
| JP | 2019-520680 | A | 7/2019 |
| KR | 10-2011-0080923 | A | 7/2011 |
| KR | 10-2015-0024724 | A | 3/2015 |
| KR | 10-1631275 | B1 | 6/2016 |
| KR | 10-2016-0128791 | A | 11/2016 |
| KR | 10-2018-0089723 | A | 8/2018 |
| KR | 10-2018-0092728 | A | 8/2018 |
| KR | 10-2018-0107569 | A | 10/2018 |
| KR | 10-2019-0009702 | A | 1/2019 |
| KR | 10-2021-0004187 | A | 1/2021 |
| KR | 10-2021-0015550 | A | 2/2021 |
| KR | 10-2021-0078139 | A | 6/2021 |
| KR | 10-2021-0080256 | A | 6/2021 |
| WO | WO 2016/030144 | A1 | 3/2016 |

OTHER PUBLICATIONS

Extended European Search Report for European Application No. 22916605.3, dated Apr. 24, 2025.

European Communication pursuant to Article 94(3) EPC for European Application No. 22 916 605.3, dated Apr. 15, 2026.

* cited by examiner

BATTERY PACK

TECHNICAL FIELD

The present application claims priority to Korean Patent Application No. 10-2021-0188346 filed on Dec. 27, 2021 in the Republic of Korea, the disclosure of which is incorporated herein by reference.

The present disclosure relates to a battery pack.

BACKGROUND ART

Currently, commercially available secondary batteries include nickel-cadmium batteries, nickel-hydrogen batteries, nickel-zinc batteries, lithium secondary batteries and the like. Among them, lithium secondary batteries have little or no memory effect, and are gaining more attention than nickel-based secondary batteries as recharging can be done whenever it is convenient. Further, lithium secondary batteries provide a low self-discharge rate with high energy density capability.

The lithium secondary batteries mainly use a lithium-based oxide and a carbon material as a positive electrode active material and a negative electrode active material, respectively. In addition, the lithium secondary batteries include an electrode assembly including a positive electrode plate and a negative electrode plate respectively coated with the positive electrode active material and the negative electrode active material and a separator interposed between the positive electrode plate and the negative electrode plate, and a hermetically sealed packaging or battery case in which the electrode assembly is received together with an electrolyte solution.

According to the shape of the battery case, lithium secondary batteries may be classified into can-type secondary batteries in which the electrode assembly is included in a metal can and pouch-type secondary batteries in which the electrode assembly is included in a pouch made of an aluminum laminate sheet.

The secondary batteries are widely used in not only small devices such as mobile electronic devices but also medium- and large-scale devices such as electric vehicles or Energy Storage Systems (ESSs), and the use is growing fast. Further, recently, home ESSs are widely used to store and supply power for use in houses or buildings. The essential component of the home ESSs is a battery pack.

Various types of battery packs including battery packs used in home ESSs include a plurality of battery cells (secondary batteries) to increase the capacity and/or output. In particular, there is a need for ESSs that are flexible to change the configuration of battery packs to satisfy various customer needs. Additionally, there is a need for ESSs that can adapt the shape to a variety of limited installation spaces.

DISCLOSURE

Technical Problem

The present disclosure is designed to solve these and other problems.

The present disclosure is directed to providing a battery pack that can change the number of battery modules.

The present disclosure is further directed to providing a battery pack that can change the number of processing units.

The present disclosure is further directed to providing a battery pack that can change the appearance.

The present disclosure is further directed to providing a battery pack including a corner cover to cover a corner between an adjacent battery module or an adjacent processing unit and a battery module.

The present disclosure is further directed to providing a battery pack with improved productivity and assembly through component sharing.

Technical Solution

To achieve the above-described objective, a battery pack according to an aspect of the present disclosure includes a first battery module; a first processor which is electrically connected to the first battery module and configured to control charge/discharge of the first battery module, wherein at least one of the first battery module or the first processor is configured to allow at least one additional battery module or at least one additional processor to be coupled to two or more sides of the first battery module or the first processor.

At least one of the first battery module or the first processor may be configured to allow the at least one additional battery module modules or the at least one additional processor to be coupled to three or more sides of the first battery module or the first processor.

The battery pack may further include a coupling member which is secured to the first battery module and the first processor.

The coupling member may be secured to a corner formed by two side plates of the first battery module and a corner formed by two side plates of the first processor.

The first battery module may be disposed on a side of the first processor.

The battery pack may further include a first coupling bar which is secured to a back plate of the first processor; a first wall mount bracket which is coupled to the first coupling bar; a second coupling bar which is secured to a back plate of the first battery module; and a second wall mount bracket which is coupled to the second coupling bar.

The first_battery module may be disposed on a rear side of the first processor.

The battery pack may further include a first stand which is secured to a bottom of the first processor and a second stand which is secured to a bottom of the first battery module.

The battery pack may further include a first corner cover which is secured to the coupling member, and configured to cover at least one of the corner of the first battery module to which the coupling member is secured or the corner of the first processor to which the coupling member is secured.

The battery pack may further include a second corner cover which is secured to the coupling member, and configured to cover at least one of the corner of the first battery module to which the coupling member is secured or the corner of the first processor to which the coupling member is secured.

To achieve the above-described objective, an energy storage system according to an aspect of the present disclosure includes the battery pack according to an aspect of the present disclosure.

The corner formed by two side plates of the first battery module and the corner formed by two side plates of the first processor may be chamfered corners.

The at least one additional battery module may be disposed on a rear side of the first battery module.

The first battery module may be under the first processor, and the at least one additional battery module may be under the first battery module.

The first battery module may be attached to a first side the first processor, and the at least one additional battery module may be a second battery module attached to a second side of the first processor and a third battery module attached to a third side of the first processor.

Advantageous Effects

According to at least one of the embodiments of the present disclosure, there may be provided the battery pack that can change the number of battery modules.

According to at least one of the embodiments of the present disclosure, there may be provided the battery pack that can change the number of processing units.

According to at least one of the embodiments of the present disclosure, there may be provided the battery pack that can change the appearance.

According to at least one of the embodiments of the present disclosure, there may be provided the battery pack including the corner cover to cover the corner between the adjacent battery module or the adjacent processing unit and the battery module.

According to at least one of the embodiments of the present disclosure, there may be provided the battery pack with improved productivity and assembly through component sharing.

DESCRIPTION OF DRAWINGS

The accompanying drawings illustrate an exemplary embodiment of the present disclosure, and together with the following detailed description, serve to provide a further understanding of the technical aspect of the present disclosure, and thus, the present disclosure should not be construed as being limited to the drawings.

BEST MODE

Hereinafter, exemplary embodiments of the present disclosure will be described in detail with reference to the accompanying drawings. Prior to the description, it should be understood that the terms or words used in the specification and the appended claims should not be construed as limited to general and dictionary meanings, but rather interpreted based on the meanings and concepts corresponding to the technical aspect of the present disclosure on the basis of the principle that the inventor is allowed to define terms appropriately for the best explanation.

Therefore, the embodiments described herein and illustrations in the accompanying drawings are exemplary embodiments of the present disclosure to describe the technical aspect of the present disclosure and are not intended to be limiting, and thus it should be understood that a variety of other equivalents and modifications could have been made thereto at the time that the application was filed.

The term such as first, second or the like may be used herein. These terms are used to distinguish one element from another, and the nature, order or sequence of the stated elements is not limited by the term.

Figure 1:
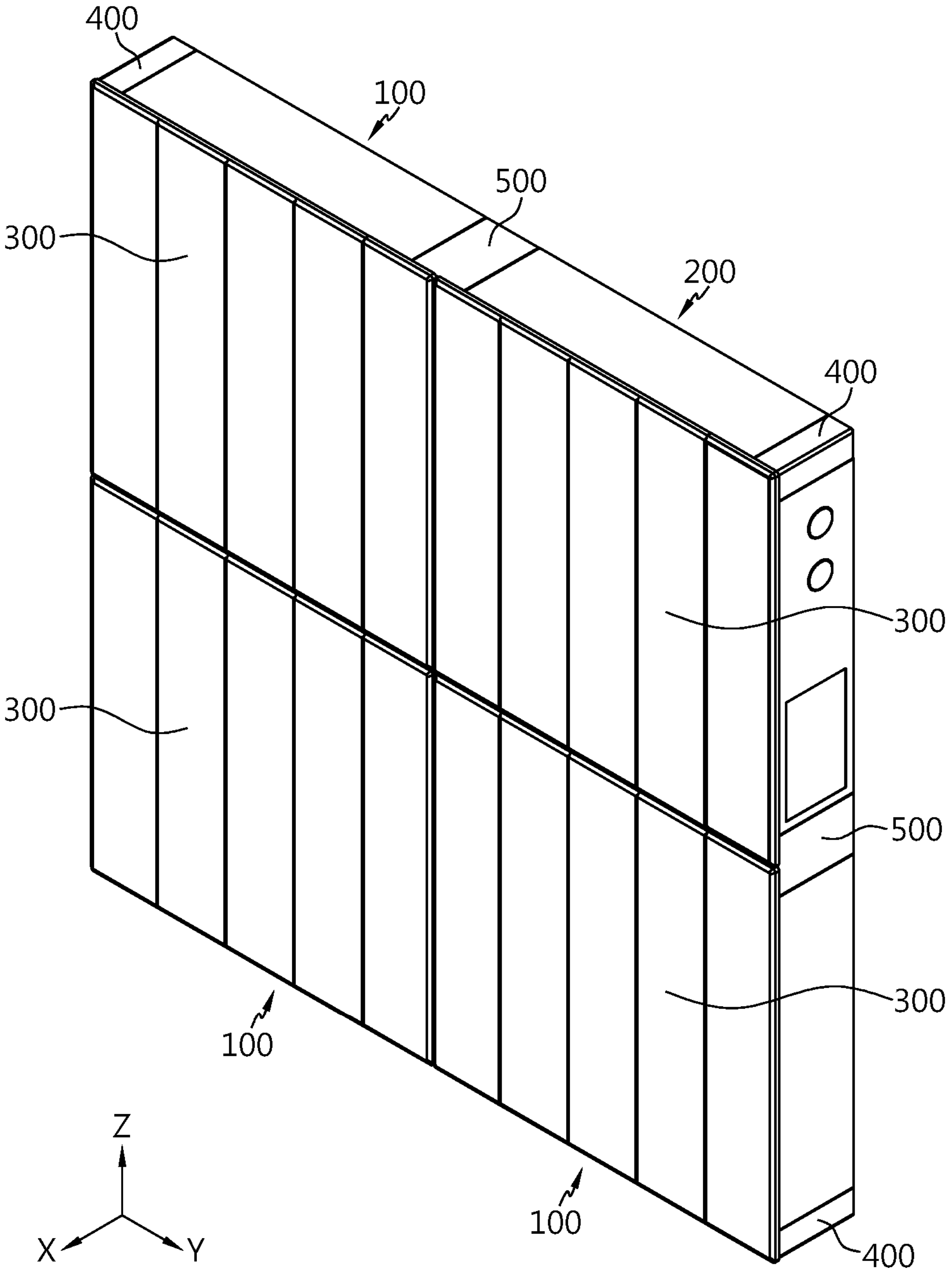
FIG. 1 is a perspective view of a battery pack according to an embodiment of the present disclosure.
Figure 2:
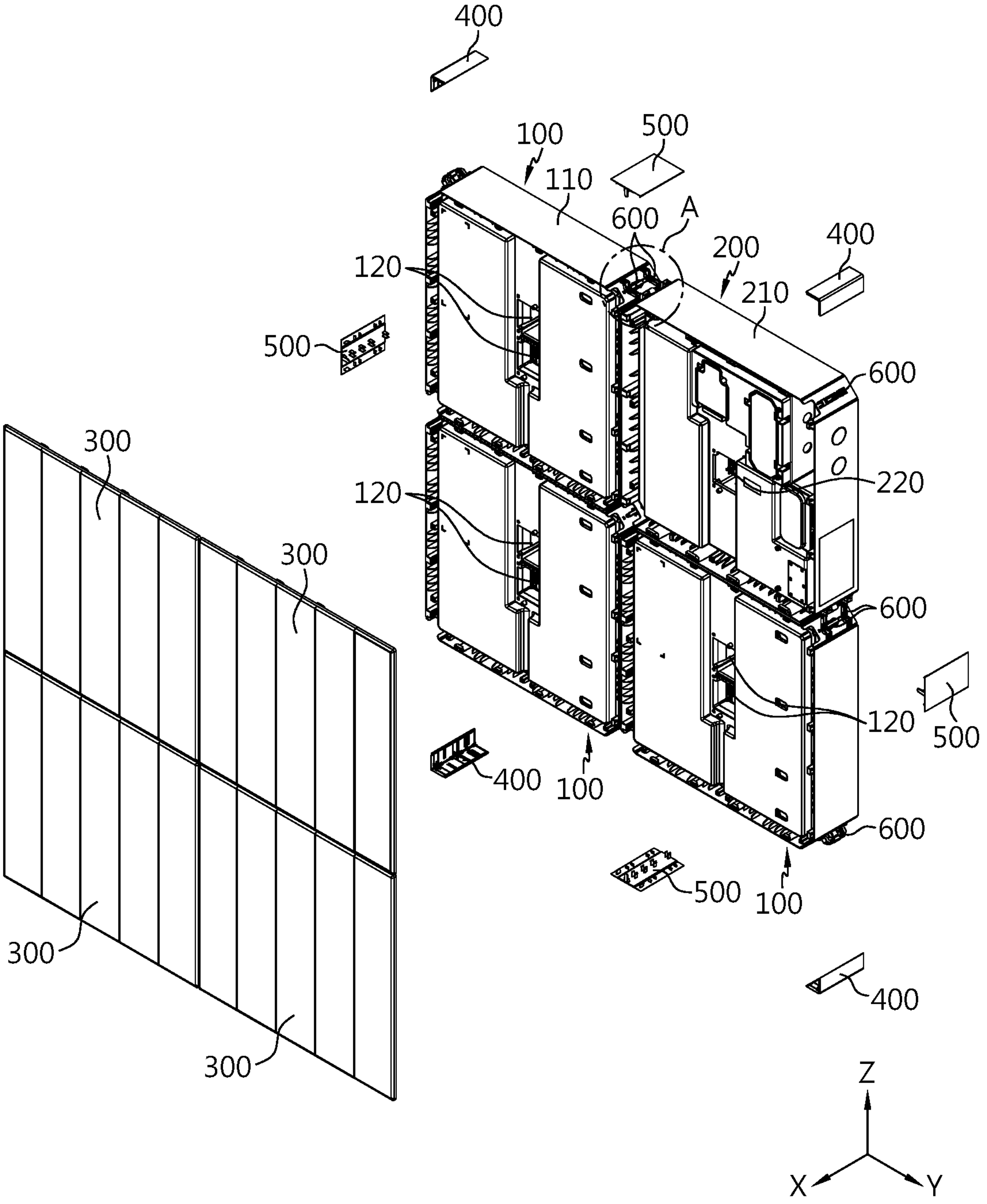
FIG. 2 is a partial exploded diagram of a battery pack according to an embodiment of the present disclosure.
Figure 3:
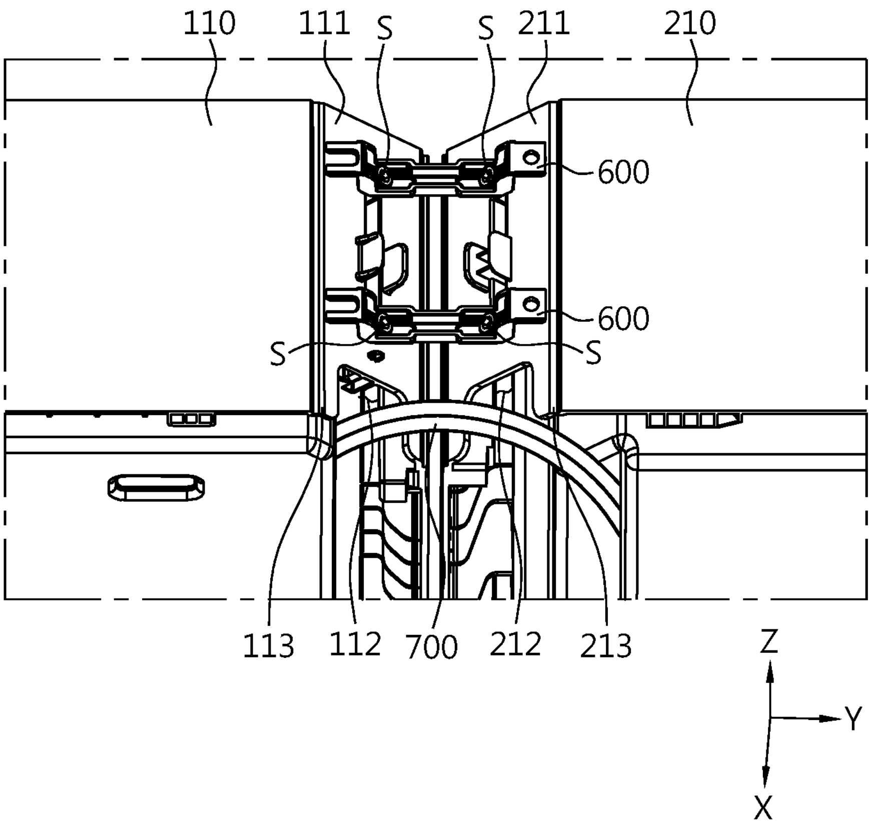
FIG. 3 is an enlarged view of section A in FIG. 2.

FIG. 1 is a perspective view of a battery pack according to an embodiment of the present disclosure. FIG. 2 is a partial exploded diagram of the battery pack according to an embodiment of the present disclosure. FIG. 3 is an enlarged view of section A in FIG. 2. Referring to FIGS. 1 to 3, the battery pack according to an embodiment of the present disclosure may include a battery module 100 and a processing unit 200. The processing unit 200 may be electrically connected to the battery module 100 to control the charge/discharge of the battery module 100. Additionally, at least one of the battery module 100 or the processing unit 200 may be configured to allow another battery module 100 or another processing unit 200 to be coupled to two or more sides thereof.

The battery module 100 may have a first corner 111 formed by two side plates and a first opening 112 at the first corner 111. The battery module 100 may have a cuboidal shape. A housing 110 may form an appearance of the battery module 100. The housing 110 of the battery module 100 may include a front plate and four side plates. Additionally, the four side plates of the housing 110 may form four corners 111. The four corners may be chamfered. Alternatively, the corner 111 may be a plate connecting two side plates. Alternatively, the corner 111 may be formed by two side plates. The corner 111 may have the opening 112. The opening 112 may be open to the front side or in the X-axis direction. The four corners 111 may have substantially identical shape. The battery module 100 may include a plurality of battery cells inside. In this instance, the battery cell may be a secondary battery. The battery module 100 may charge the battery cell with power or discharge the power in the battery cell. The battery pack may include a plurality of battery modules 100 according to the amount of power or output required. For example, the battery pack may include three battery modules 100 as shown in FIG. 1.

The processing unit 200 may be disposed on one side of the battery module 100 to control the charge/discharge of the battery module 100, and may have a second corner 211 adjacent to the first corner 111 and a second opening 212 at the second corner 211. The processing unit 200 may have a cuboidal shape. The housing 210 may form an appearance of the processing unit 200. The appearance or size of the processing unit 200 and the battery module 100 may be very similar or substantially identical to each other. A housing 210 of the processing unit 200 may include a front plate and four side plates. Additionally, the four side plates of the housing 210 may form four corners 211. The four corners 211 may be chamfered. Alternatively, the corner 211 may be a plate connecting two side plates. Alternatively, the corner 211 may be formed by two side plates. The corner 211 may have the opening 212. The opening 212 may be open to the front side or in the X-axis direction. The four corners 211 may have substantially identical shape. The battery module 100 may include the plurality of battery cells inside. In this instance, the battery cell may be a secondary battery. The processing unit 200 may be electrically connected, joined or coupled to a plurality of battery modules 100. The processing unit 200 may control the charge/discharge of the battery module 100. Additionally, the processing unit 200 may detect and acquire condition information of the battery module 100. The battery pack may include a plurality of processing units 200 to control the plurality of battery modules 100.

For example, as shown in FIG. 1, the battery pack may include three battery modules 100 and one processing unit 200. The three battery modules 100 and one processing unit 200 may be electrically connected to each other. The processing unit 200 may control the charge/discharge of the three battery modules 100, and acquire or detect condition information of the three battery modules 100 such as voltage or temperature.

Each corner 111 of the battery module 100 and each corner 211 of the processing unit 200 may have substantially identical shape. Accordingly, another battery module 100 or another processing unit 200 may be coupled to each of at least two of the four sides of the battery module 100. Alternatively, another battery module 100 or another processing unit 200 may be coupled to each of at least two of the four side plates of the battery module 100.

Additionally, the battery module 100 or another processing unit 200 may be coupled to each of at least two of the four sides of the processing unit 200. Alternatively, the battery module 100 or another processing unit 200 may be coupled to each of at least two of the four side plates of the processing unit 200.

According to this configuration of the present disclosure, the battery pack may include various combinations of at least one battery module 100 and at least one processing unit 200. Additionally, the battery module 100 and the processing unit 200 of the battery pack may have various positional relationships or connection relationships. Accordingly, it is possible to flexibly respond to various amounts of power or outputs required for the battery pack. Additionally, as the appearance of the battery pack may be adaptable, the battery pack may be free of the limitation of the space in which the battery pack is installed.

Referring to FIGS. 1 to 3, a corner cover 500 may cover the first opening 112 and the second opening 212. The corner cover 500 may be referred to as a double corner cover 500. The double corner cover 500 may be disposed at an area where the corner 111 of the battery module 100 and the corner 211 of the processing unit 200 are adjacent to each other. Alternatively, the double corner cover 500 may be disposed at an area where the two corners 111, 211 are adjacent to each other. In this instance, the two adjacent corners 111, 211 may be the corner 111 of the battery module 100 or the corner 211 of the processing unit 200. Alternatively, in this instance, each of the two adjacent corners 111 may be the corner 111 of the adjacent battery module 100. Alternatively, in this instance, the two adjacent corners 211 may be the corner 211 of the adjacent processing unit 200. For example, referring to FIGS. 1 and 2, the battery pack may include two double corner covers 500 to cover the corners 111, 211 formed by the processing unit 200 and the adjacent battery module 100, and may include two double corner covers 500 to cover the corner 111 formed by two adjacent battery modules 100.

Additionally, according to this configuration of the present disclosure, the double corner cover 500 may cover the corner 111 of the adjacent battery module 100 or the corner 211 of the adjacent processing unit 200 or the adjacent battery module 100 and the corner 211 of the processing unit 200 to protect the internal components of the battery pack. The battery module 100 and the processing unit 200 may have the openings 112, 212 for connection to an external configuration, and in case where the openings 112, 212 are exposed, the inside may be damaged by impurity infiltration. The double corner cover 500 may cover the openings 112, 212 to protect the inside of the battery module 100 or the processing unit 200. Accordingly, it is possible to improve the safety and life of the battery pack.

Additionally, according to this configuration of the present disclosure, the double corner cover 500 may prevent sunlight from entering the battery module 100 or the processing unit 200 through the openings 112, 212 when the battery pack is installed outdoors. Accordingly, it is possible to improve the safety and life of the battery pack.

FIG. 3 is an enlarged view of section A in FIG. 2. Referring to FIG. 3, a cable 700 may electrically connect the battery module 100 to the processing unit 200. Additionally, the cable 700 may electrically connect two battery modules 100. Additionally, when the battery pack includes the plurality of processing units 200, the cable 700 may electrically connect two processing units 200. A plurality of cables 700 may be included. The cable 700 may convey the power or a signal. The at least one battery module 100 and the at least one processing unit 200 of the battery pack may be arranged in various patterns. The cable 700 may be configured to pass through the openings 112, 212 at the corners 111, 211 disposed at a location at which it is easy to electrically connect the battery module 100 to the processing unit 200. The cable 700 may pass through the openings 112, 212 at the corners 111, 211 of any one of the battery module 100 and the processing unit 200 and then the openings 112, 212 at the corners 111, 211 of the other one.

The double corner cover 500 may cover the cable 700. The cable 700 and the openings 112, 212 may be covered by the double corner cover 500.

According to this configuration of the present disclosure, the double corner cover 500 may cover the cable 700 to prevent the infiltration of impurities into the cable 700. Additionally, the double corner cover 500 may cover the cable 700 to prevent sunlight-induced damage to the cable 700. Accordingly, it is possible to improve the safety and life of the battery pack.

Referring to FIG. 3, the battery pack according to an embodiment of the present disclosure may further include a coupling member 600 which is secured to the battery module 100 and the processing unit 200. The coupling member 600 may physically connect, couple or join two adjacent battery modules 100. Additionally, the coupling member 600 may physically connect, couple or join two adjacent processing units 200. Additionally, the coupling member 600 may physically connect, couple or join the battery module 100 to the processing unit 200 adjacent to the battery module 100.

According to this configuration of the present disclosure, the coupling member 600 may stably connect, couple or join the battery module 100 and the processing unit 200 of the battery pack.

Referring to FIG. 3, the coupling member 600 of the battery pack according to an embodiment of the present disclosure may be secured to the corner formed by two side plates of the battery module 100 to the corner formed by two side plates of the processing unit 200.

One side of the coupling member 600 may be secured to the first corner 111 by a fastening member S. Additionally, the other side of the coupling member 600 may be secured to the second corner 211 by the fastening member S. A plurality of coupling members 600 may be included. For example, referring to FIG. 3, two coupling members 600 may be secured to the battery module 100 and the processing unit 200. The two coupling members 600 may physically connect, couple or join the battery module 100 to the processing unit 200.

According to this configuration of the present disclosure, the coupling member 600 may stably connect, couple or join the battery module 100 and the processing unit 200 of the battery pack.

Referring to FIG. 3, the battery module 100 of the battery pack according to an embodiment of the present disclosure may be disposed on one side of the processing unit 200. That is, the side of the battery module 100 and the side of the processing unit 200 may face each other or come into contact with each other. Alternatively, the side plate of the battery module 100 and the side plate of the processing unit 200 may face each other or come into contact with each other.

Additionally, referring to FIG. 3, the battery module 100 may be configured to allow another battery module 100 to be disposed on one side thereof. That is, the sides of the adjacent battery modules 100 may face each other or come into contact with each other. Alternatively, the side plates of the adjacent battery modules 100 may face each other or come into contact with each other.

According to this configuration of the present disclosure, the battery module 100 and the processing unit 200 may be arranged in close contact with each other. Accordingly, it is possible to reduce the installation space of the battery pack.

Figure 4:
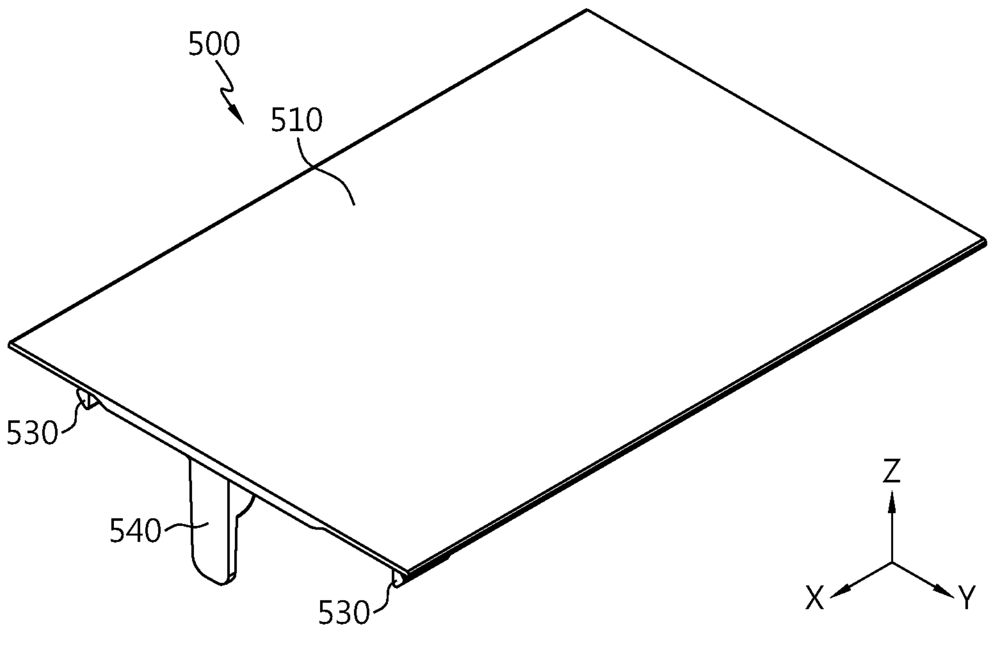
FIG. 4 is a diagram of a corner cover of a battery pack according to an embodiment of the present disclosure when viewed from the outside.
Figure 5:
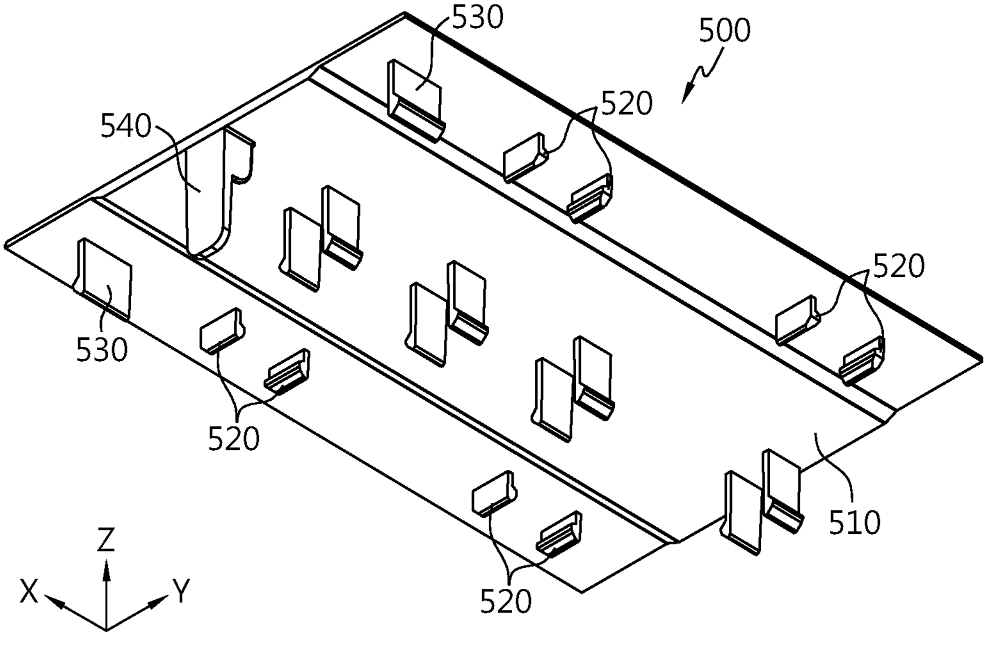
FIG. 5 is a diagram of a corner cover of a battery pack according to an embodiment of the present disclosure when viewed from the inside.
Figure 6:
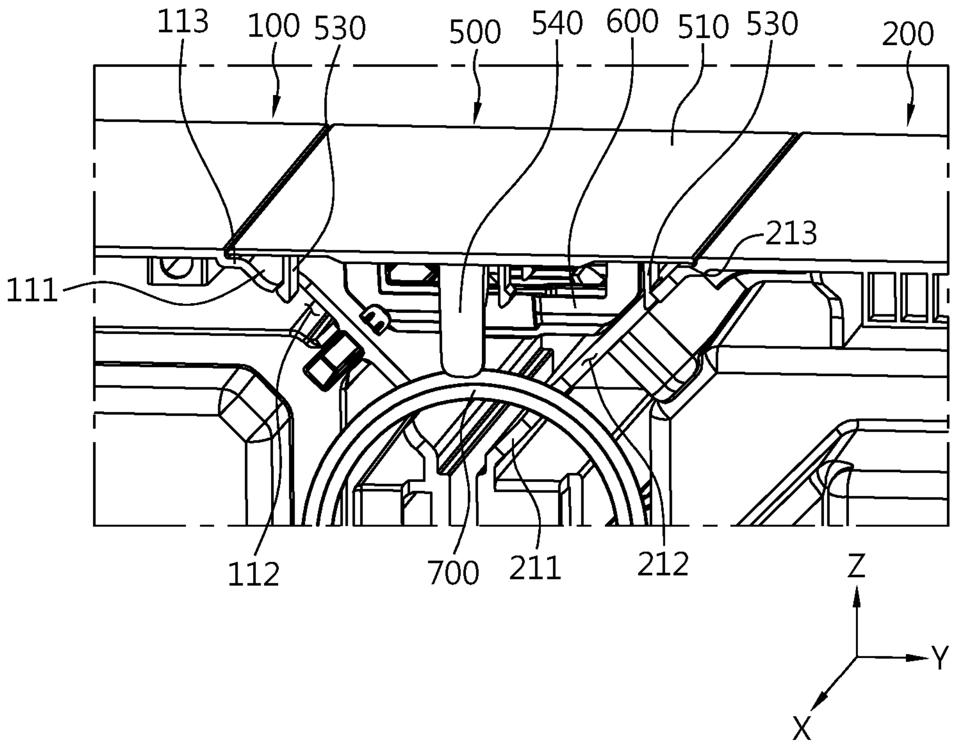
FIG. 6 is a diagram of a corner cover of a battery pack according to an embodiment of the present disclosure, coupled to a battery module and a processing unit.
Figure 7:
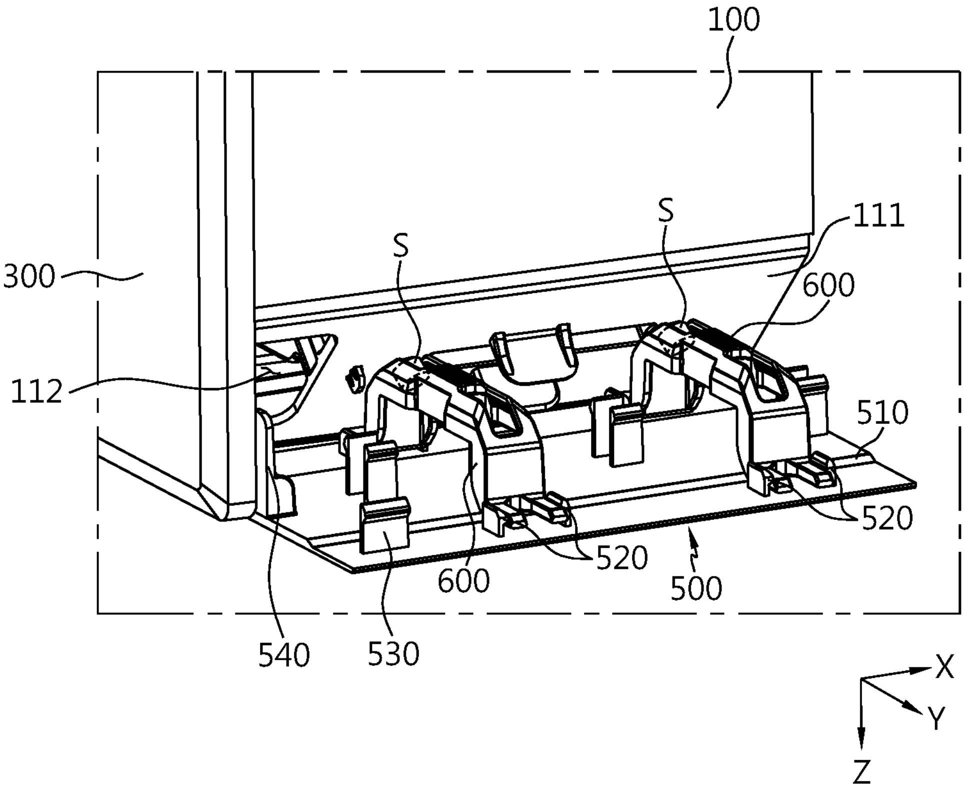
FIG. 7 is a diagram of a corner cover of a battery pack according to an embodiment of the present disclosure, coupled to a coupling member.
Figure 8:
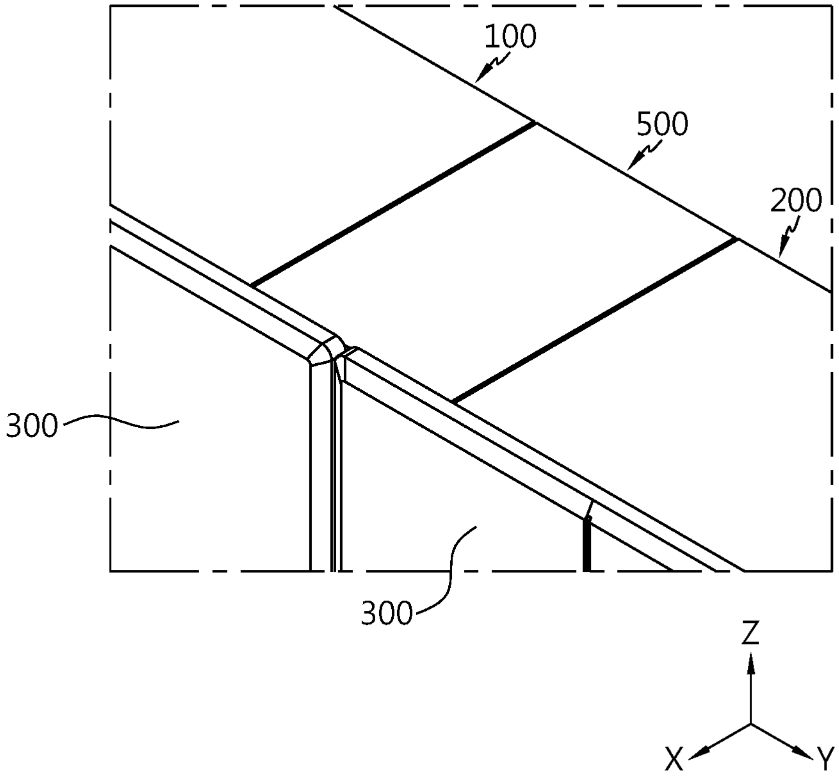
FIG. 8 is an enlarged diagram of a corner cover of a battery pack according to an embodiment of the present disclosure.

FIG. 4 is a diagram of the corner cover of the battery pack according to an embodiment of the present disclosure when viewed from the outside. FIG. 5 is a diagram of the corner cover of the battery pack according to an embodiment of the present disclosure when viewed from the inside. FIG. 6 is a diagram of the corner cover of the battery pack according to an embodiment of the present disclosure, coupled to the battery module and the processing unit. FIG. 7 is a diagram of the corner cover of the battery pack according to an embodiment of the present disclosure, coupled to the coupling member. FIG. 8 is an enlarged diagram of the corner cover of the battery pack according to an embodiment of the present disclosure.

Referring to FIGS. 4 and 8, the corner cover of the battery pack according to an embodiment of the present disclosure may have a shape of a flat plate. The double corner cover may include a plate, and the plate may be in the shape of a flat plate. The double corner cover may connect the side plates of the two adjacent battery modules. Additionally, the double corner cover may connect the side plates of the two adjacent processing units. Additionally, referring to FIG. 8, the double corner cover may connect the side plate of the battery module to the side plate of the processing unit adjacent to the battery module.

According to this configuration of the present disclosure, the double corner cover may cover the gap between the adjacent battery modules, or the gap between the adjacent processing units, or the gap between the battery module and the processing unit adjacent to the battery module to prevent the infiltration of impurities. Accordingly, it is possible to improve the safety and life of the battery pack.

Referring to FIGS. 4, 5 and 7, the corner cover 500 of the battery pack according to an embodiment of the present disclosure may include the first hook 520 that is formed on the inner surface and coupled to the coupling member 600. The double corner cover 500 may include the first hook 520 that protrudes inward of the plate 510. A plurality of first hooks 520 may be included. Two pairs of first hooks 520 may be secured to one coupling member 600. For example, referring to FIGS. 5 and 7, the double corner cover 500 may include four pairs of first hooks 520. Two pairs of first hooks 520 may be secured to each of two coupling members 600.

According to this configuration of the present disclosure, the double corner cover 500 may be easily hook-coupled to the coupling member 600 without any fastening member. Accordingly, it is possible to improve the assembly and productivity of the battery pack.

Referring to FIGS. 4, 5 and 6, the corner cover 500 of the battery pack according to an embodiment of the present disclosure may include a second hook 530 that is formed on the inner surface and coupled to the first opening 112 or the second opening 212.

The double corner cover 500 may include the second hook 530 that protrudes inward of the plate 510. A plurality of second hooks 530 may be included. For example, referring to FIG. 6, the double corner cover 500 may include the second hook 530 that is secured to the first opening 112 and the second hook 530 that is secured to the second opening 212.

According to this configuration of the present disclosure, the double corner cover 500 may be easily hook-coupled to the battery module 100 or the processing unit 200 without any fastening member. Accordingly, it is possible to improve the assembly and productivity of the battery pack.

Referring to FIGS. 3 and 6, the battery module 100 of the battery pack according to an embodiment of the present disclosure may further include a first step portion 113 at the first corner 111. Additionally, the processing unit 200 may further include a second step portion 213 at the second corner 211. Additionally, the corner cover 500 may be seated on the first step portion 113 and the second step portion 213.

The first step portion 113 may be formed on two sides of the first corner 111. The first step portion 113 may be formed inward of the side plates that form the first corner 111. The step of the first step portion 113 may be substantially equal to the thickness of the plate 510 of the double corner cover 500.

The second step portion 213 may be formed on two sides of the second corner 211. The second step portion 213 may be formed inward of the side plates that form the second corner 311. The step of the second step portion 213 may be substantially equal to the thickness of the plate 510 of the double corner cover 500.

The plate 510 of the double corner cover 500 may be seated on the first step portion 113 and the second step portion 213. The first step portion 113 and the second step portion 213 may support the plate 510.

According to this configuration of the present disclosure, the double corner cover 500 may be seated on the first step portion 113 and the second step portion 213 to maintain stable coupling with the battery module 100 or the processing unit 200. Accordingly, it is possible to improve the stability of the battery pack.

Referring to FIGS. 1, 2 and 7, the battery pack according to an embodiment of the present disclosure may further include a first front cover and a second front cover.

The first front cover 300 may be disposed on the front surface of the battery module 100. Alternatively, the first front cover 300 may be secured or coupled to the front plate or the front surface of the battery module 100. The first front cover 300 may have a larger area than the front surface or the front plate of the battery module 100. The battery module 100 may have a port 120 on the front surface or the front plate. The cable 700 may be connected to the port 120. The battery module 100 may be electrically connected to another adjacent battery module 100 or the processing unit 200 through the port 120. The first front cover 300 may cover the port 120 and the cable 700 connected to the port 120.

The second front cover 300 may be disposed on the front surface of the processing unit 200. Alternatively, the second front cover 300 may be secured or coupled to the front plate or the front surface of the processing unit 200. The second front cover 300 may have a larger area than the front surface or the front plate of the processing unit 200. The processing unit 200 may have a port 220 on the front surface or the front plate. The cable 700 may be connected to the port 220. The processing unit 200 may be electrically connected to the adjacent battery module 100 or another processing unit 200 through the port 220. The second front cover 300 may cover the port 220 and the cable 700 connected to the port 120. The first front cover 300 and the second front cover 300 may have substantially identical shape and structure.

At least one of the first front cover 300 or the second front cover 300 may cover the front side of the double corner cover 500. Referring to FIG. 8, the first front cover 300 and the second front cover 300 may cover the front side of the double corner cover 500. Additionally, the first front cover 300 and the second front cover 300 may cover the space between the double corner cover 500 and the battery module 100 and the space between the double corner cover 500 and the processing unit 200.

According to this configuration of the present disclosure, the first front cover 300, the second front cover 300 and the double corner cover 500 may cover the gap between the adjacent battery modules 100, or the gap between the adjacent processing units 200, or the gap between the battery module 100 and the processing unit 200 adjacent to the battery module 100 to prevent the infiltration of impurities. Accordingly, it is possible to improve the safety and life of the battery pack.

Referring to FIGS. 7 and 8, the corner cover 500 of the battery pack according to an embodiment of the present disclosure may include a supporting portion 540 that is disposed on the front side and supports the rear surface of the first front cover 300 or the second front cover 300.

The supporting portion 540 may protrude inward of the plate 510. The supporting portion 540 may be disposed on the front side of the plate 510. The supporting portion 540 may support an area where the first front cover 300 and the second front cover 300 are adjacent to each other. Parts of the supporting portion 540 may support the rear surface of the first front cover 300, and parts of the supporting portion 540 may support the rear surface of the second front cover 300.

According to this configuration of the present disclosure, the first front cover 300 and the second front cover 300 may maintain stable coupling by the double corner cover 500. Accordingly, it is possible to improve the strength or stability of the battery pack.

Figure 9:
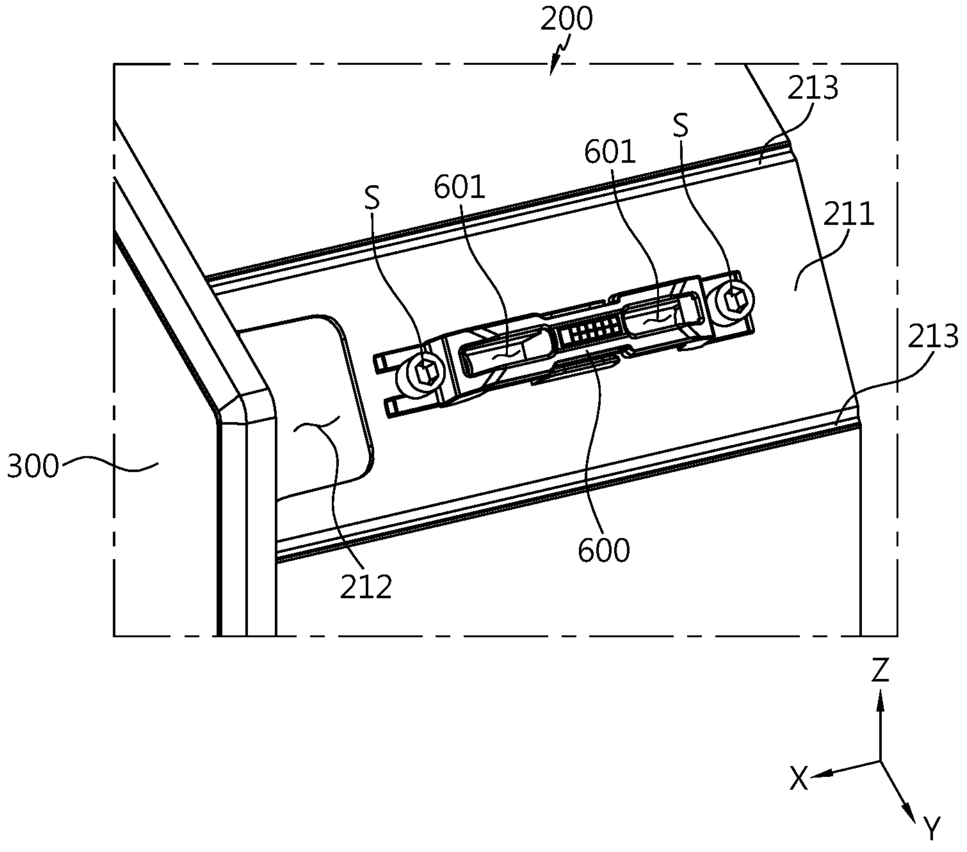
FIG. 9 is a perspective view of a corner of a battery pack according to an embodiment of the present disclosure.

FIG. 9 is a perspective view of the corner of the battery pack according to an embodiment of the present disclosure. Referring to FIG. 9, the coupling member may be secured to the corner 211 of the battery pack according to an embodiment of the present disclosure. The corners 111, 211 may be the corner 111 of the battery module 100 or the corner 211 of the processing unit 200. The corners 111, 211 may be the corner 111 of the outermost battery module 100 of the battery pack or the corner 211 of the outermost processing unit 200 of the battery pack. The coupling member 600 may be secured to the corners 111, 211. The two sides of the coupling member 600 may be secured to the corners 111, 211 by the fastening member S. For example, referring to FIG. 9, the two sides of the coupling member 600 may be secured to the corner 211 of the processing unit 200.

Figure 10:
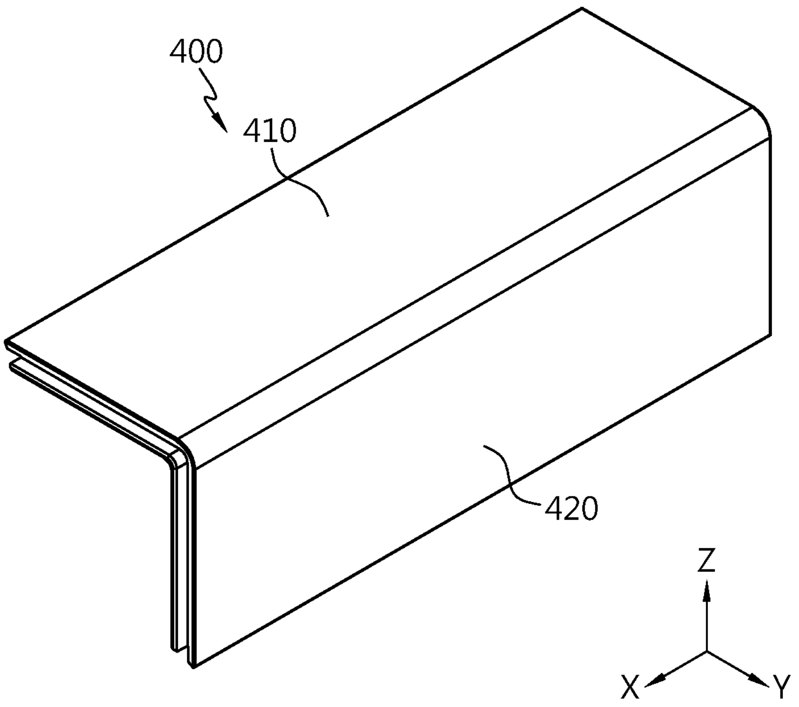
FIG. 10 is a perspective view of a corner cover of a battery pack according to an embodiment of the present disclosure.
Figure 11:
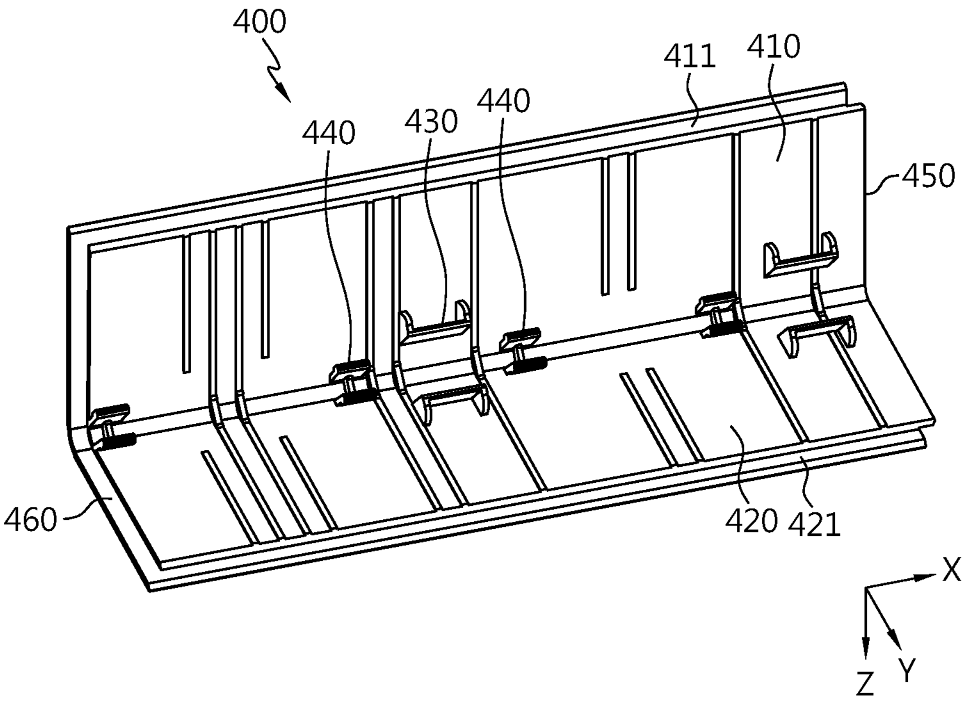
FIG. 11 is a perspective view showing an inner surface of a corner cover of a battery pack according to an embodiment of the present disclosure.

FIG. 10 is a perspective view of a corner cover 400 of the battery pack according to an embodiment of the present disclosure. FIG. 11 is a perspective view showing the inner surface of the corner cover 400 of the battery pack according to an embodiment of the present disclosure. The battery pack according to an embodiment of the present disclosure may include the corner cover 400. The corner cover 400 may be referred to as a single corner cover 400. The single corner cover 400 may have a bent plate shape. The single corner cover 400 may include a first part 410 and a second part 420. The first part 410 and the second part 420 may form the bent plate shape. For example, the first part 410 and the second part 420 may be vertically connected to each other. The single corner cover 400 may be coupled to any one of the four corners 111, 211 of the battery module 100 or the processing unit 200.

The single corner cover 400 may include a guide 430 and a hook 440 on the inner surface. A pair of guides 430 may be included. Two pairs of hooks 440 may be included. Each of the pair of guides 430 may be disposed in each of the first part 410 and the second part 420. For each pair of hooks 440 may be disposed in each of the first part 410 and the second part 420. The single corner cover 400 may include a protruding portion 450 that protrudes forward. The protruding portion 450 may be formed over the first part 410 and the second part 420. Additionally, the single corner cover 400 may have a groove 460 on the rear side. The groove 460 may be formed over the first part 410 and the second part 420.

Figure 12:
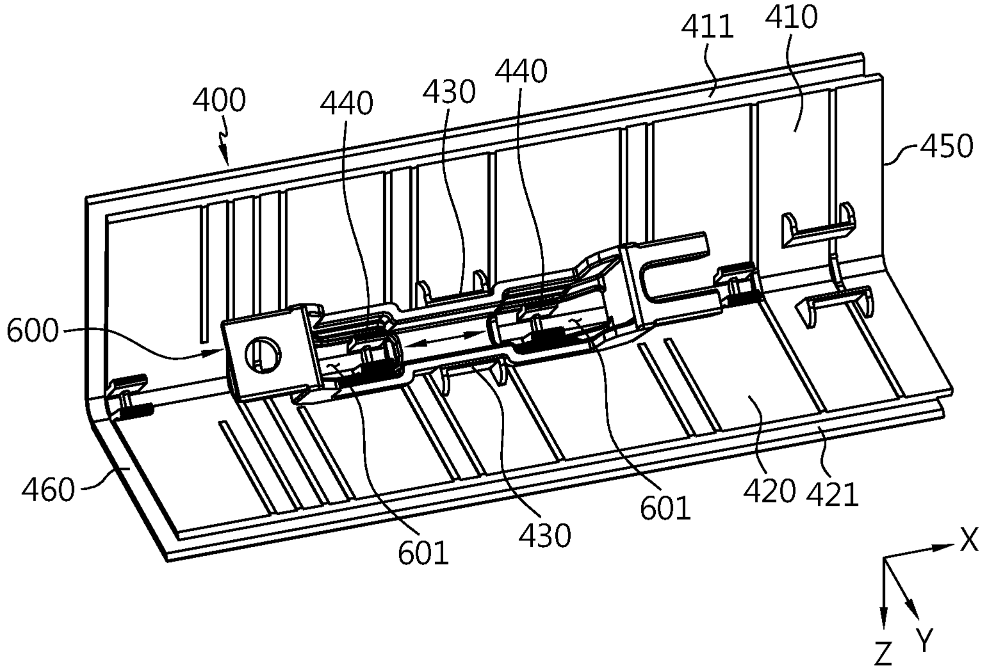
FIG. 12 is a diagram showing the coupling between a corner cover and a coupling member of a battery pack according to an embodiment of the present disclosure.

FIG. 12 is a diagram showing the coupling between the corner cover 400 and the coupling member 600 of the battery pack according to an embodiment of the present disclosure. Referring to FIG. 12, the hooks 440 may be secured to the coupling member 600. The hooks 440 may be secured to holes 601 of the coupling member 600. The coupling member 600 may have a pair of holes 601. The pair of hooks 440 may be secured to one hole 601. The coupling member 600 may be disposed between the pair of guides 430. The single corner cover 400 may be hook-coupled to the coupling member 600 and slidably move in the front-rear direction. The guides 430 may guide the single corner cover 400 to slidably move along the coupling member 600.

According to this configuration of the present disclosure, the single corner cover 400 may be easily hook-coupled to the coupling member 600 without any fastening member. Accordingly, it is possible to improve the assembly and productivity of the battery pack.

Figure 13:
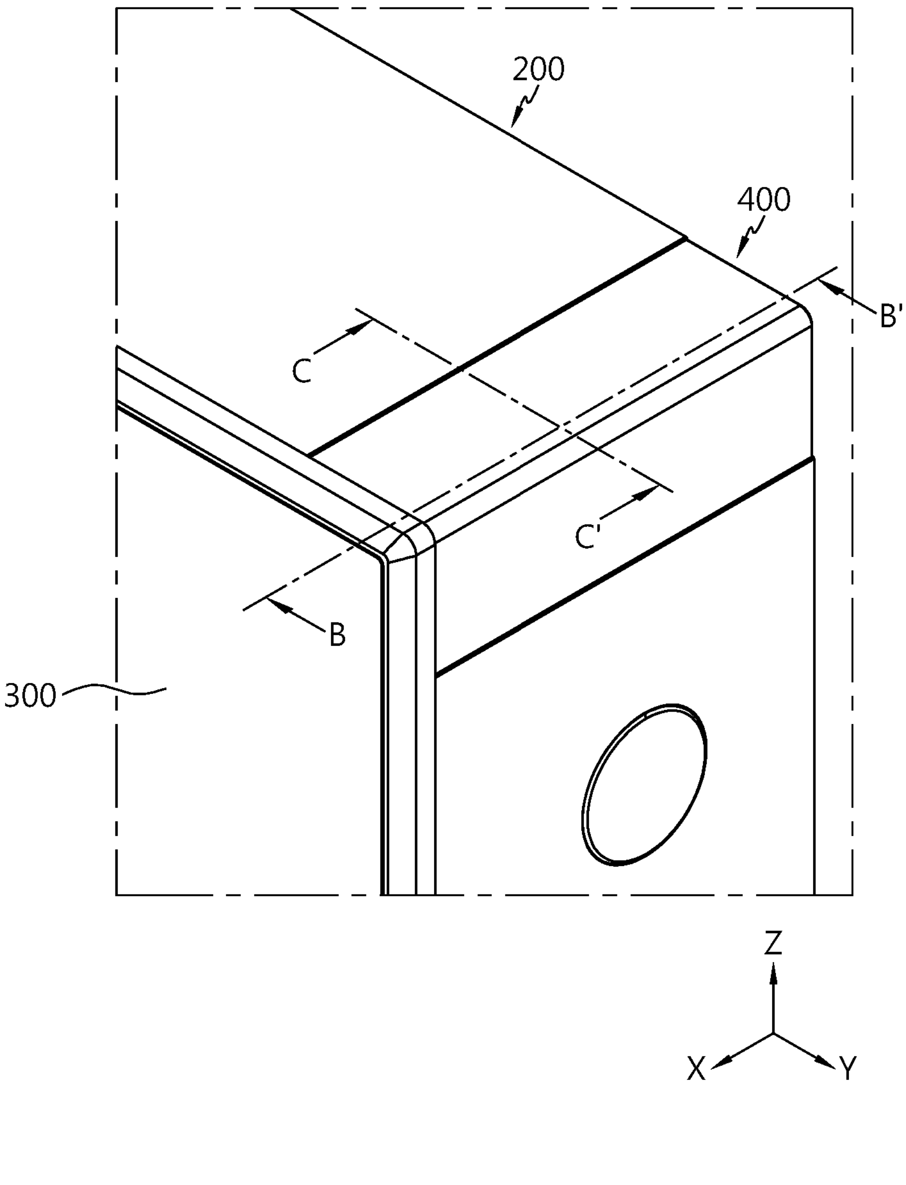
FIG. 13 is a diagram of a corner cover coupled to a corner of a battery pack according to an embodiment of the present disclosure.
Figure 14:
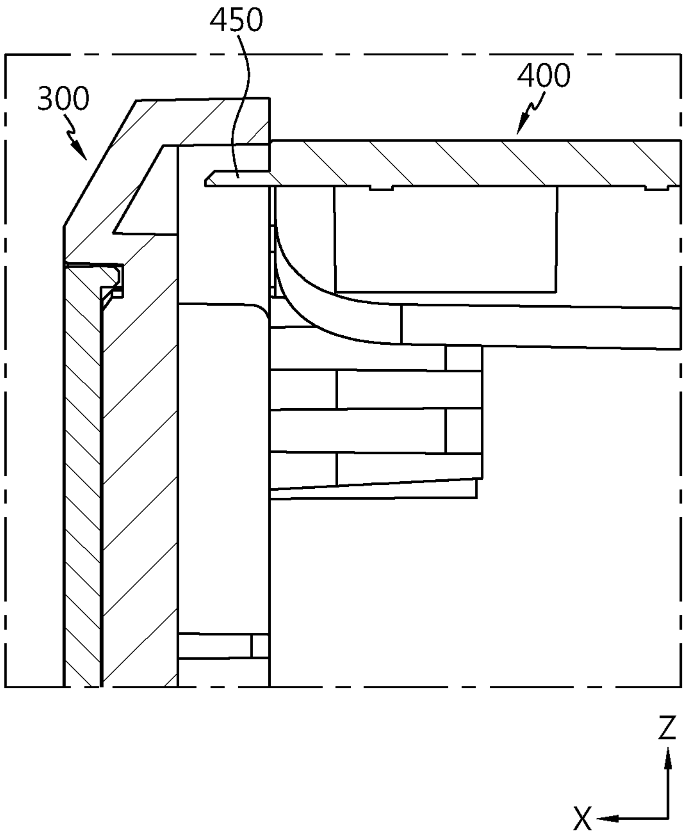
FIG. 14 is a partial cross-sectional view of FIG. 13, taken along the line B-B'.
Figure 15:
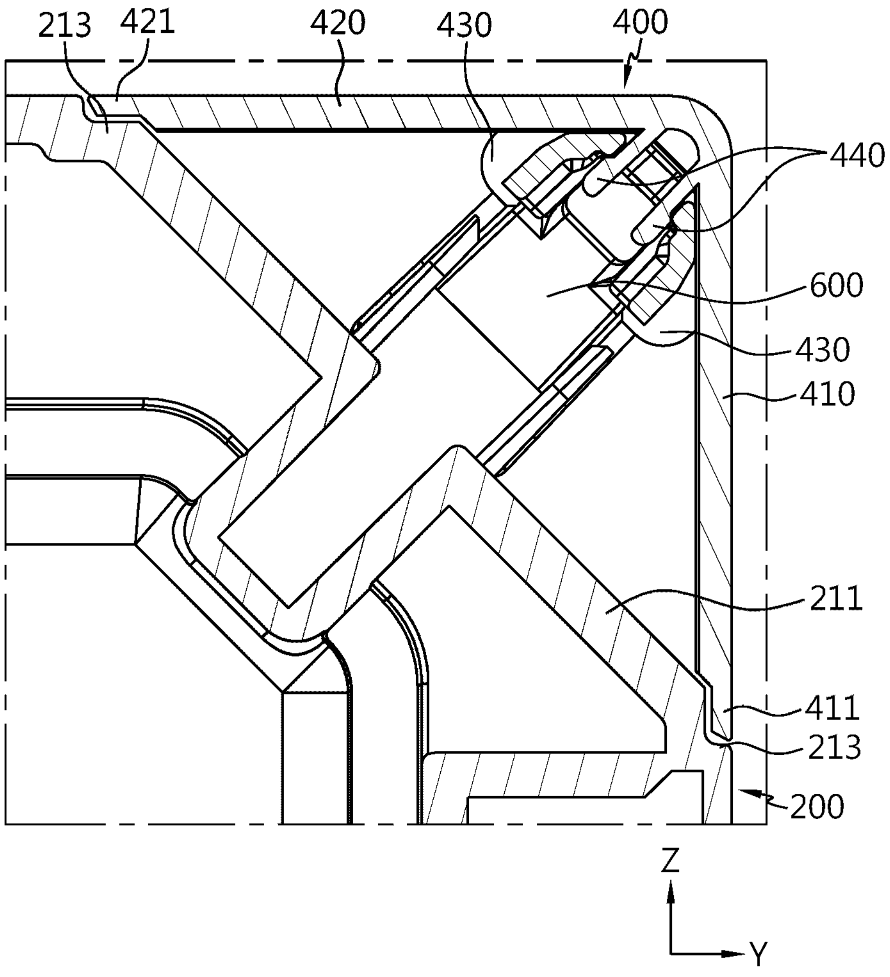
FIG. 15 is a partial cross-sectional view of FIG. 13, taken along the line C-C'.

FIG. 13 is a diagram of the corner cover 400 coupled to the corners 111, 211 of the battery pack according to an embodiment of the present disclosure. FIG. 14 is a partial cross-sectional view of FIG. 13, taken along the line B-B'. FIG. 15 is a partial cross-sectional view of FIG. 13, taken along the line C-C'. Referring to FIGS. 12 to 15, the single corner cover 400 of the battery pack according to an embodiment of the present disclosure may slidably move and come into (close) contact with the front cover 300. The protruding portion 450 of the single corner cover 400 may be inserted into the front cover 300.

The single corner cover 400 may include a seating portion 411 along the edge of the first part 410. Additionally, the single corner cover 400 may include a seating portion 421 along the edge of the second part 420. The seating portions 411, 421 of the single corner cover 400 may be seated on the step portion 213 of the corner 211. The step portion 213 may support the seating portions 411, 421 of the single corner cover 400. Additionally, the single corner cover 400 may cover the opening 212 of the corner 211.

According to this configuration of the present disclosure, the single corner cover 400 may be seated on the first step portion 113 and the second step portion 213 to maintain stable coupling with the battery module 100 or the processing unit 200. Accordingly, it is possible to improve the stability of the battery pack.

Additionally, according to this configuration of the present disclosure, the battery module 100 and the processing unit 200 may have the openings 112, 212 for connection to an external configuration, and the inside may be damaged by infiltration of impurities in case where the openings 112, 212 are exposed. The single corner cover 400 may cover the openings 112, 212 to protect the inside of the battery module 100 or the processing unit 200. Accordingly, it is possible to improve the safety and life of the battery pack.

Figure 16:
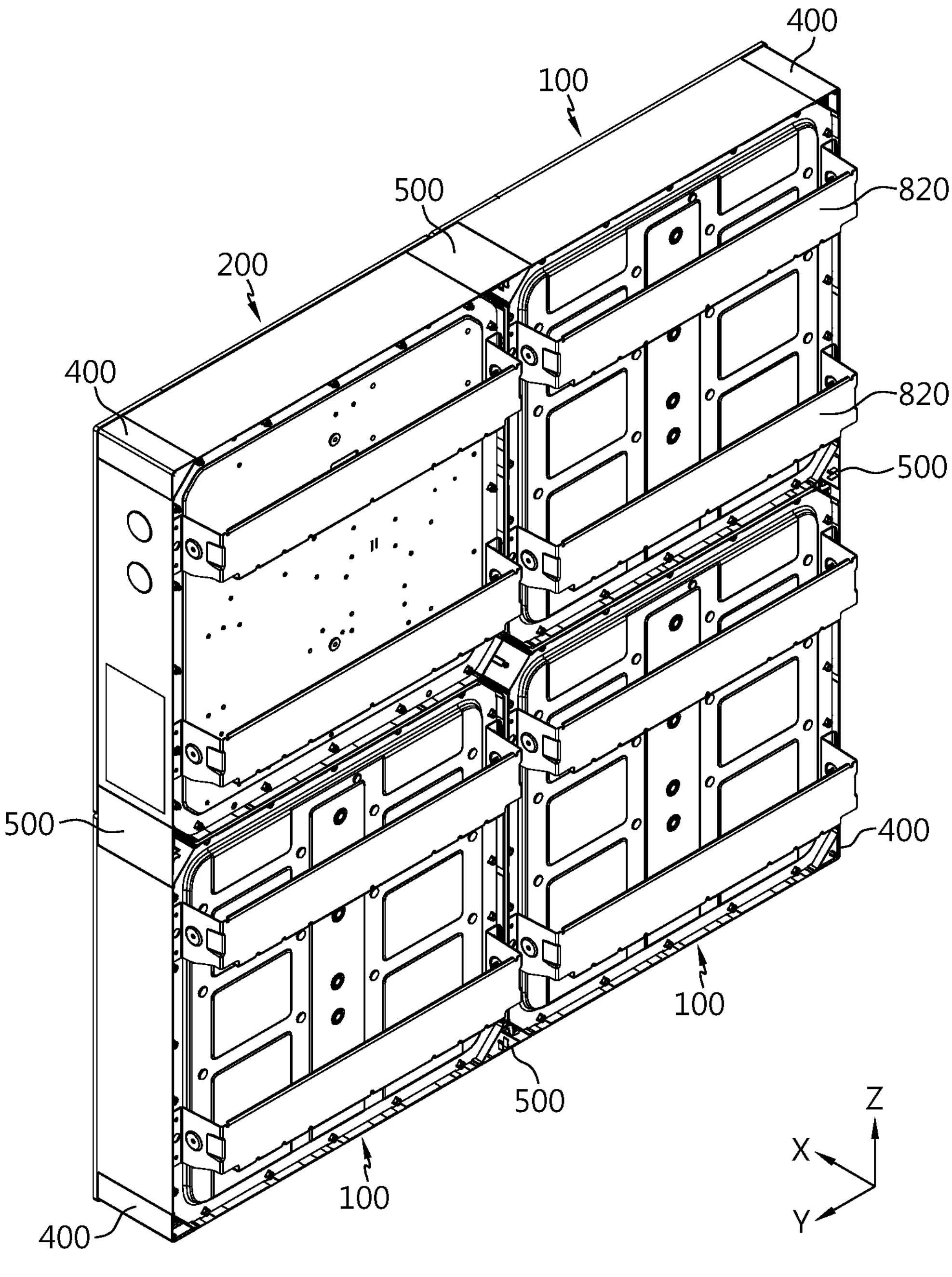
FIG. 16 is a perspective view of a battery pack according to an embodiment of the present disclosure when viewed from the rear side.
Figure 17:
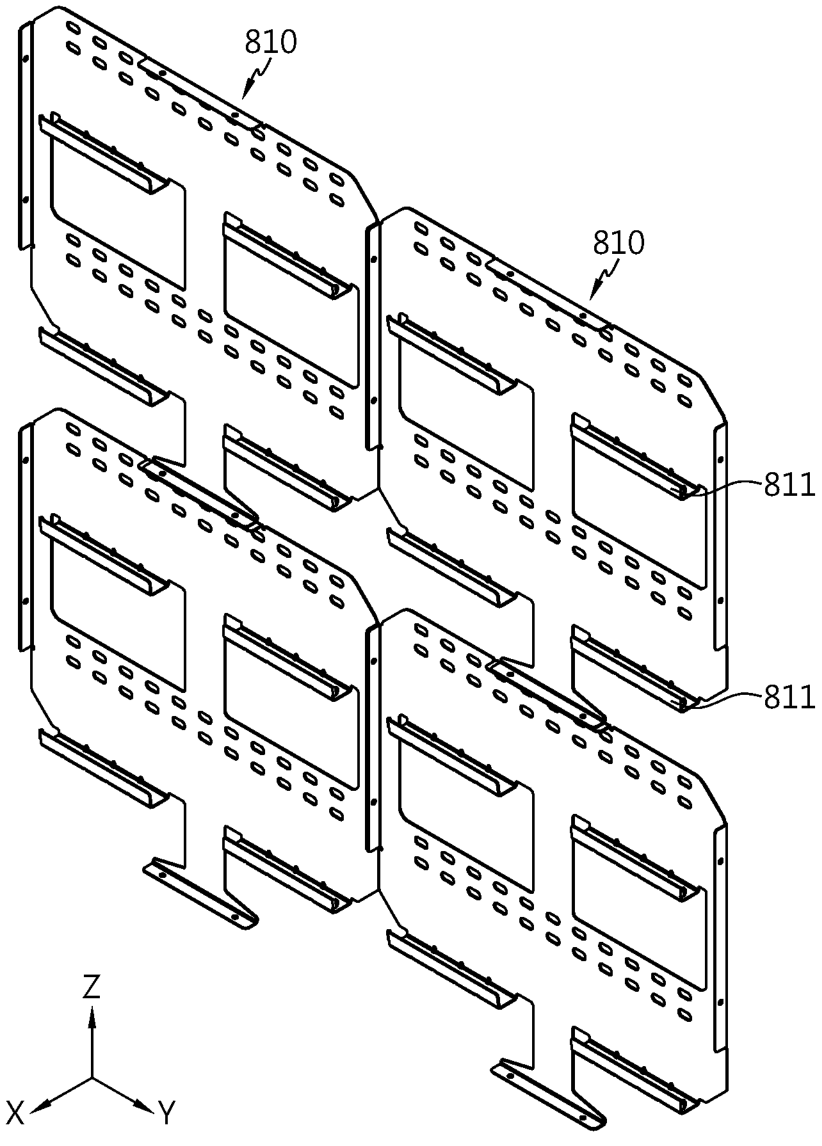
FIG. 17 is a diagram of a wall mount bracket of a battery pack according to an embodiment of the present disclosure.

FIG. 16 is a perspective view of the battery pack according to an embodiment of the present disclosure when viewed from the rear side. FIG. 17 is a diagram of a wall mount bracket 810 of the battery pack according to an embodiment of the present disclosure. Referring to FIGS. 16 and 17, the battery pack according to an embodiment of the present disclosure may include a coupling bar and the wall mount bracket. A first coupling bar 820 may be secured to the back plate of the processing unit 200. A second coupling bar 820 may be secured to the back plate of the battery module 100. The first wall mount bracket 810 may be coupled to the first coupling bar 820. The second wall mount bracket 810 may be coupled to the second coupling bar 820.

The coupling bar 820 may be disposed in each of the battery module 100 and the processing unit 200. Each of the battery module 100 and the processing unit 200 may have two coupling bars 820. The coupling bar 820 may be disposed on or secured to the rear surface of the battery module 100 or the processing unit 200. For example, referring to FIG. 16, the two coupling bars 820 on the rear surface of the battery module 100 may be arranged in parallel. Additionally, the two coupling bars 820 on the rear surface of the processing unit 200 may be arranged in parallel.

According to this configuration of the present disclosure, it is possible to form and install the battery pack with various designs. As the coupling bar 820 is disposed in each battery module 100 or each processing unit 200, and the wall mount bracket 810 is coupled to each coupling bar 820, it is possible to easily install various types of battery packs.

Referring to FIG. 17, the battery pack according to an embodiment of the present disclosure may include the wall mount bracket 810. The wall mount bracket 810 may be installed on a structure such as walls or an anchorage such as exterior walls of buildings. The wall mount bracket 810 may include a hanger portion 811. The coupling bar 820 of the battery module 100 or the coupling bar 820 of the processing unit 200 may be put on or coupled to the hanger portion 811. A plurality of wall mount brackets 810 may be included. The number of wall mount brackets 810 may be equal to the sum of the number of battery modules 100 and the number of processing units 200. The wall mount bracket 810 may have a one-to-one correspondence relationship with the battery module 100 and the processing unit 200.

According to this configuration of the present disclosure, the corresponding number of wall mount brackets 810 to the number of battery modules 100 or the number of processing units 200 of the battery pack may be included. Accordingly, it is possible to easily install battery packs of various designs or types at the wall or structure.

Figure 18:
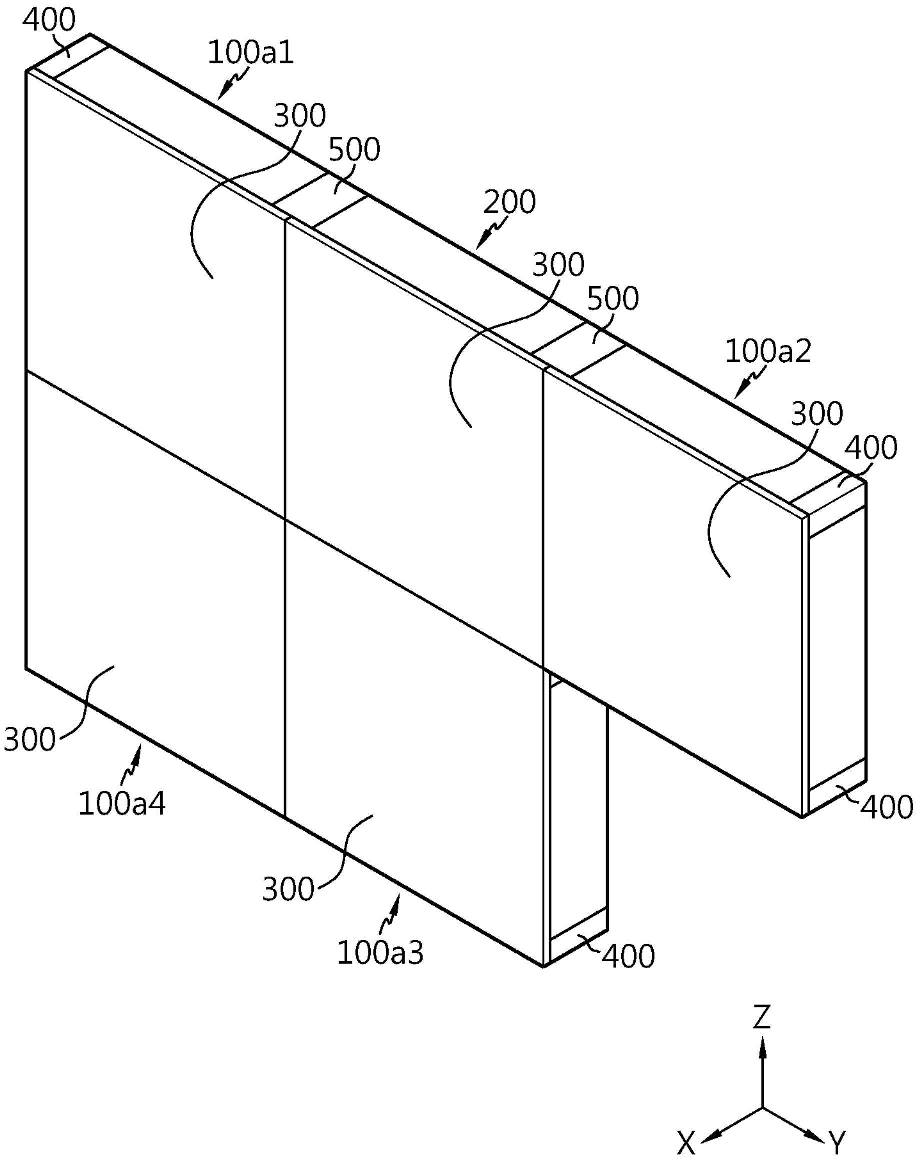
FIG. 18 is a perspective view of a battery pack according to another embodiment of the present disclosure.

FIG. 18 is a perspective view of the battery pack according to another embodiment of the present disclosure. Referring to FIG. 18, at least one of the battery modules **100*a*1, 100*a*2, 100*a*3, 100*a*4 or the processing unit 200 of the battery pack according to another embodiment of the present disclosure may be configured to allow another battery module 100*a*1, 100*a*2, 100*a*3, 100*a*4 or another processing unit 200 to be coupled to three or more sides thereof. For example, referring to FIG. 18, the battery modules 100*a*1, 100*a*2, 100*a*3 may be coupled to three of the four sides of the processing unit 200. Alternatively, the battery modules 100*a*1, 100*a*2, 100*a*3 may be coupled to three of the four side plates of the processing unit 200. Additionally, the battery modules 100*a*1, 100*a*2, 100*a*3, 100*a*4 and the processing unit 200 may be coupled through the coupling member 600**.

The processing unit 200 may control the charge/discharge of four battery modules 100, and detect condition information of the four battery modules **100*a*1, 100*a*2, 100*a*3, 100*a*4. The battery pack may include the double corner cover 500 to cover the corner 111 of the adjacent battery modules 100*a*1, 100*a*2, 100*a*3, 100*a*4. Additionally, the battery pack may include the single corner cover 400 and the double corner cover 500 to cover the outermost battery modules 100*a*1, 100*a*2, 100*a*3, 100*a*4 and the corner 211 of the processing unit 200. Additionally, the battery pack may have five wall mount brackets 810 for installation. Additionally, each of the battery modules 100*a*1, 100*a*2, 100*a*3, 100*a*4 and the processing unit 200 may be equipped with the front cover 300** on the front surface thereof.

According to this configuration of the present disclosure, the battery module 100 and the processing unit 200 of the battery pack may have various positional relationships or connection relationships. Accordingly, it is possible to flexibly respond to various amounts of power or outputs required for the battery pack. Additionally, as the appearance of the battery pack may be adaptable, the battery pack may be free of the limitation of the space in which the battery pack is installed.

Figure 19:
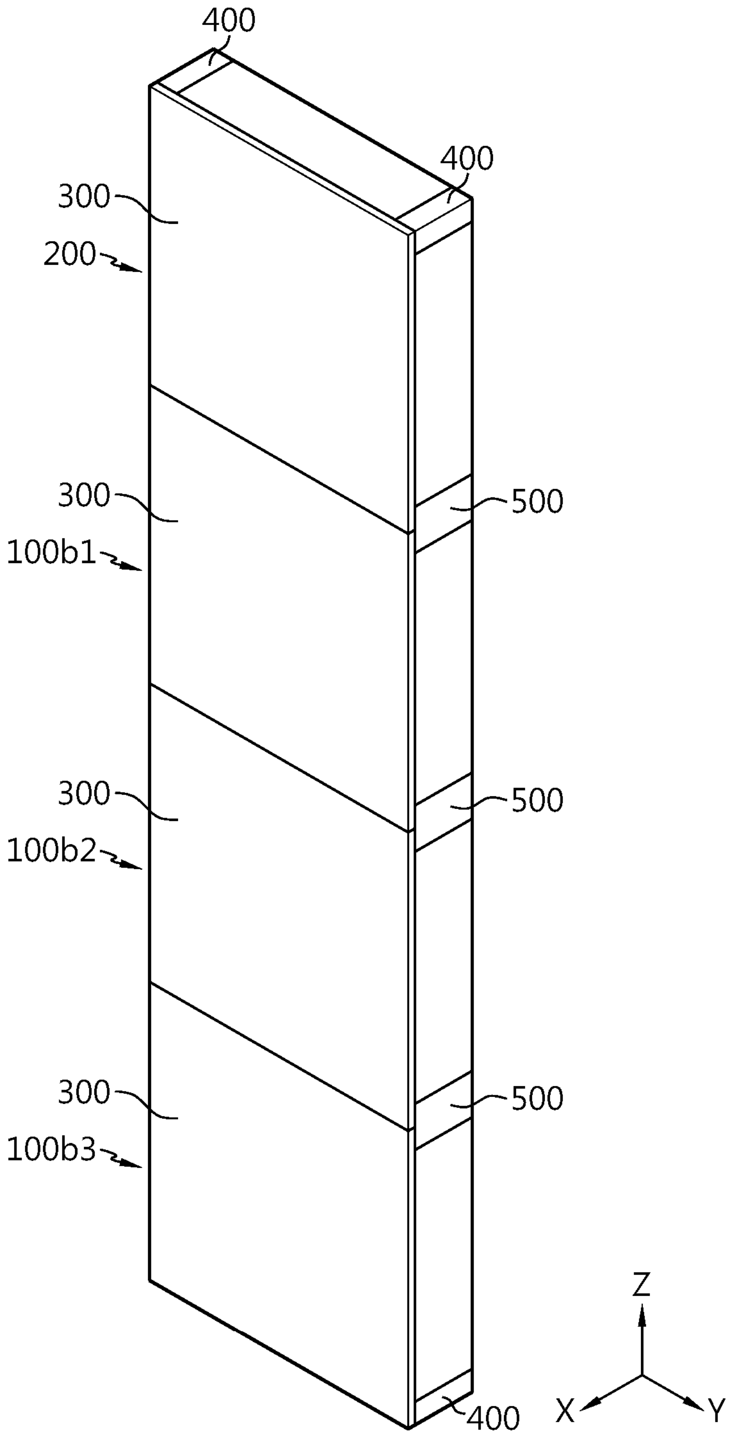
FIG. 19 is a perspective view of a battery pack according to another embodiment of the present disclosure.

FIG. 19 is a diagram of the battery pack according to another embodiment of the present disclosure. Referring to FIG. 19, the battery pack according to another embodiment of the present disclosure may include one processing unit 200 and three battery modules 100. The one processing unit 200 and three battery modules **100*b*1, 100*b*2, 100*b*3 may be arranged in a line. The one processing unit 200 and three battery modules 100*b*1, 100*b*2, 100*b*3 may be coupled through the coupling member 600. Additionally, the battery pack may include the single corner cover 400 and the double corner cover 500 to cover the outermost battery modules 100*b*1, 100*b*2, 100*b*3 and the corner 211 of the processing unit 200. Additionally, the battery pack may have four wall mount brackets 810 for installation. Additionally, each of the battery modules 100*b*1, 100*b*2, 100*b*3 and the processing unit 200 may be equipped with the front cover 300** on the front surface thereof.

Figure 20:
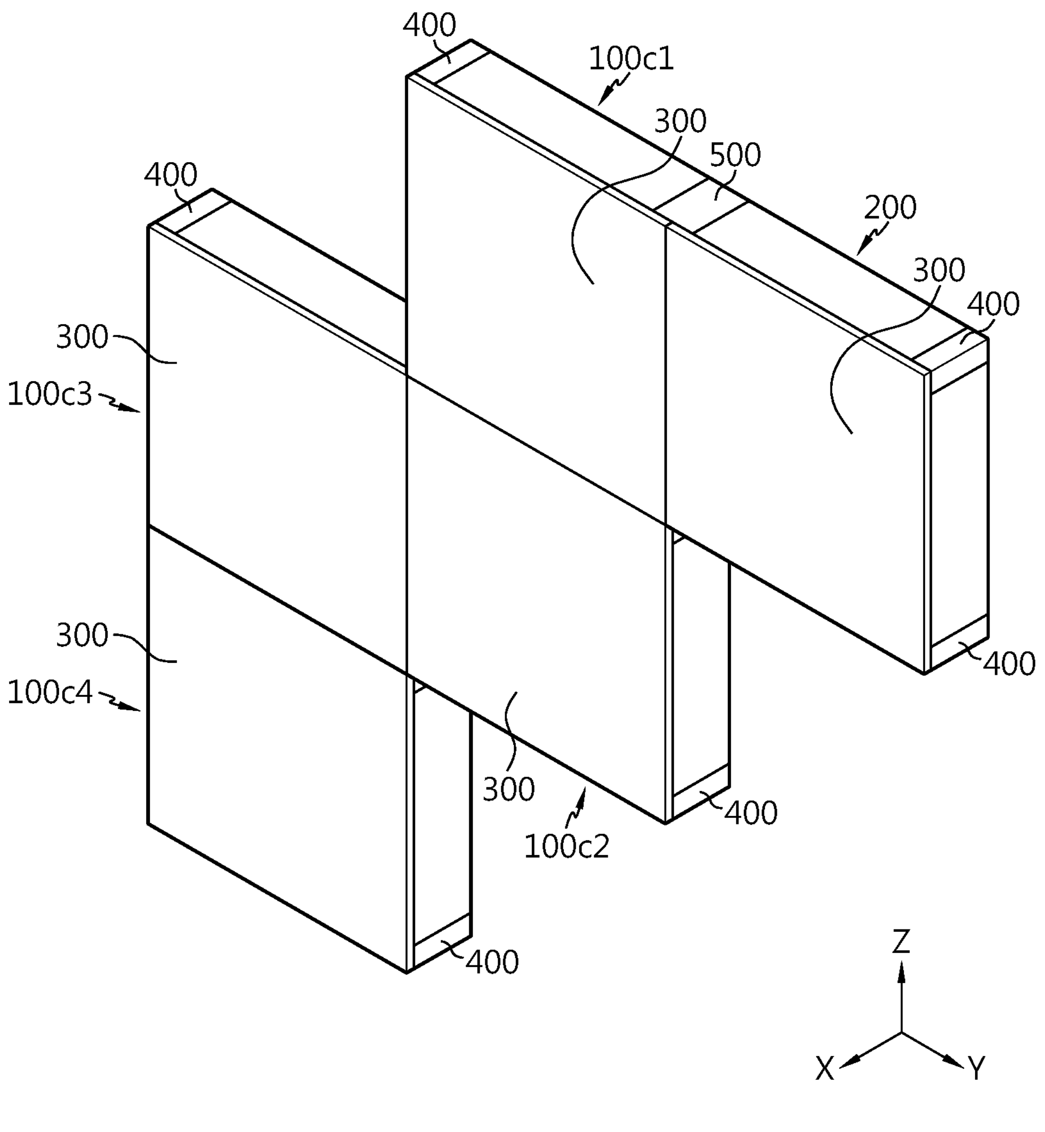
FIG. 20 is a perspective view of a battery pack according to another embodiment of the present disclosure.

FIG. 20 is a diagram of the battery pack according to another embodiment of the present disclosure. Referring to FIG. 20, the battery pack according to another embodiment of the present disclosure may include one processing unit 200 and four battery modules **100*c*1, 100*c*2, 100*c*3, 100*c*4. The processing unit 200 may control the charge/discharge of the four battery modules 100*c*1, 100*c*2, 100*c*3, 100*c*4, and detect condition information of the four battery modules 100*c*1, 100*c*2, 100*c*3, 100*c*4. The battery pack may include the double corner cover 500 to cover the corner 111 of the adjacent battery modules 100*c*1, 100*c*2, 100*c*3, 100*c*4. Additionally, the battery pack may include the single corner cover 400 and the double corner cover 500 to cover the outermost battery modules 100*c*1, 100*c*2, 100*c*3, 100*c*4 and the corner 211 of the processing unit 200. Additionally, the battery pack may have five wall mount brackets 810 for installation. Additionally, each of the battery modules 100*c*1, 100*c*2, 100*c*3, 100*c*4 and the processing unit 200 may be equipped with the front cover 300** on the front surface thereof.

Figure 21:
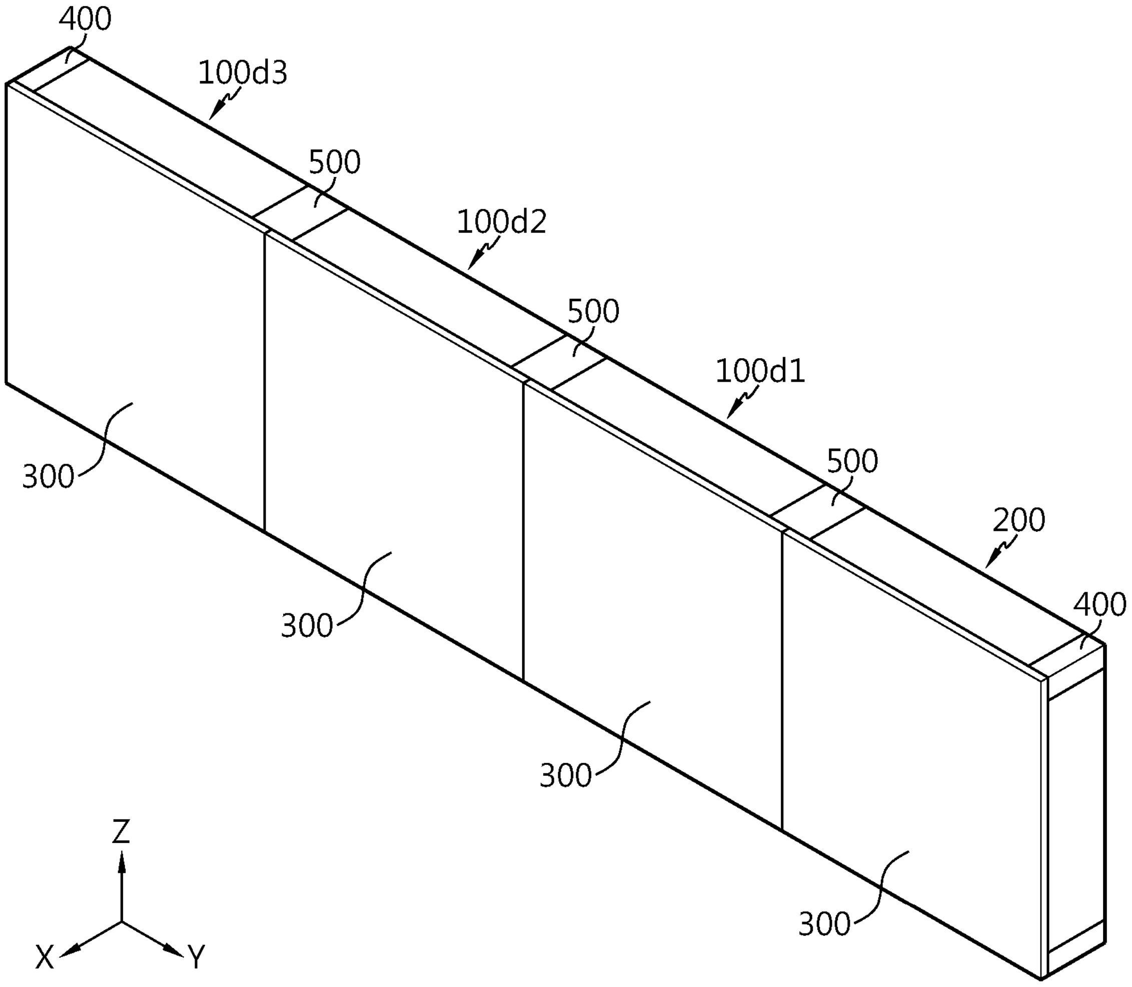
FIG. 21 is a perspective view of a battery pack according to another embodiment of the present disclosure.

FIG. 21 is a diagram of the battery pack according to another embodiment of the present disclosure. Referring to FIG. 21, the battery pack according to another embodiment of the present disclosure may include one processing unit 200 and three battery modules 100. The one processing unit 200 and three battery modules **100*d*1, 100*d*2, 100*d*3 may be arranged in a line. The one processing unit 200 and three battery modules 100*d*1, 100*d*2, 100*d*3 may be coupled through the coupling member 600. Additionally, the battery pack may include the single corner cover 400 and the double corner cover 500 to cover the outermost battery modules 100*d*1, 100*d*2, 100*d*3 and the corner 211 of the processing unit 200. Additionally, the battery pack may have four wall mount brackets 810 for installation. Additionally, each of the battery modules 100*d*1, 100*d*2, 100*d*3 and the processing unit 200 may be equipped with the front cover 300** on the front surface thereof.

Figure 22:
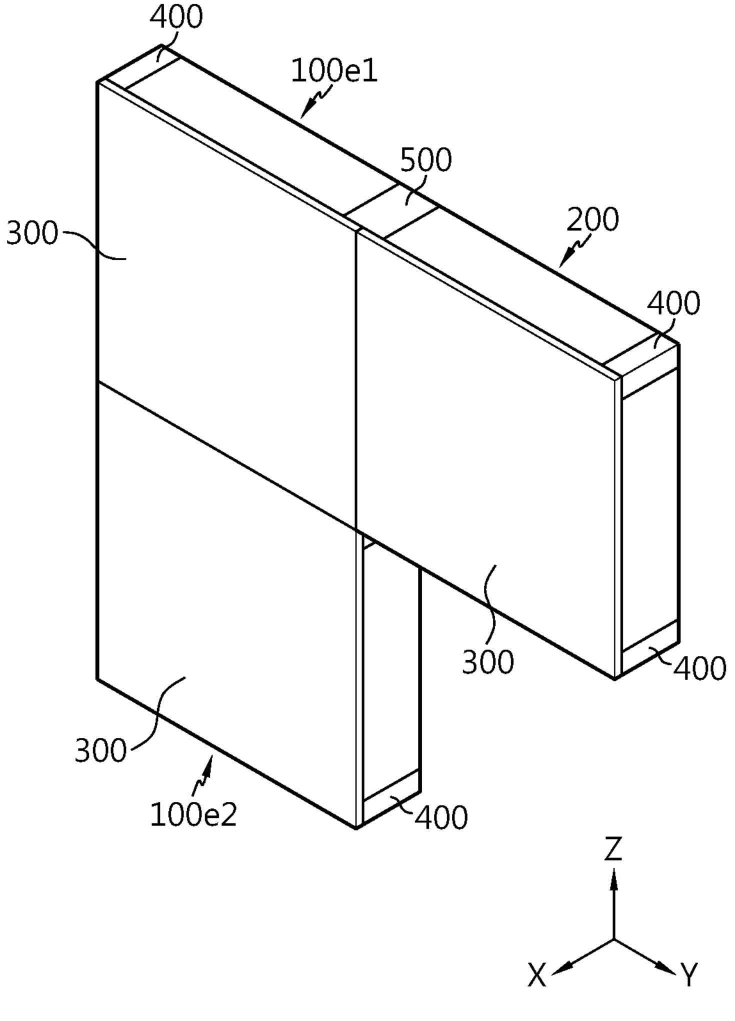
FIG. 22 is a perspective view of a battery pack according to another embodiment of the present disclosure.

FIG. 22 is a diagram of the battery pack according to another embodiment of the present disclosure. Referring to FIG. 22, the battery pack according to another embodiment of the present disclosure may include one processing unit 200 and two battery modules **100*e*1, 100*e*2. The processing unit 200 may control the charge/discharge of the two battery modules 100*e*1, 100*e*2, and detect condition information of the two battery modules 100*e*1, 100*e*2. The battery pack may include the single corner cover 400 and the double corner cover 500 to cover the corner 111 of the outermost battery modules 100*e*1, 100*e*2 and the corner 211 of the processing unit 200. Additionally, the battery pack may have three wall mount brackets 810 for installation. Additionally, each of the battery modules 100*e*1, 100*e*2 and the processing unit 200 may be equipped with the front cover 300** on the front surface thereof.

Figure 23:
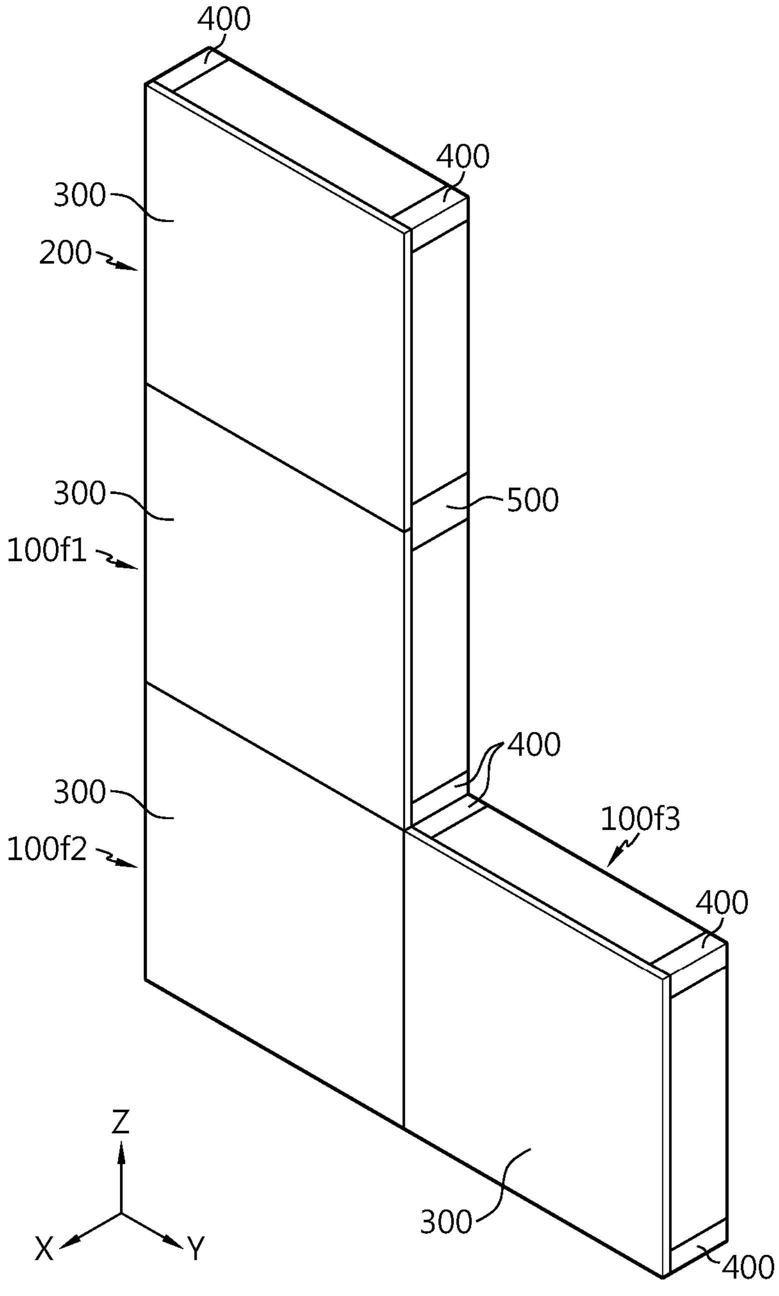
FIG. 23 is a perspective view of a battery pack according to another embodiment of the present disclosure.

FIG. 23 is a diagram of the battery pack according to another embodiment of the present disclosure. Referring to FIG. 23, the battery pack according to another embodiment of the present disclosure may include one processing unit 200 and three battery modules **100*f*1, 100*f*2, 100*f*3. The processing unit 200 may control the charge/discharge of the three battery modules 100*f*1, 100*f*2, 100*f*3, and detect condition information of the three battery modules 100*f*1, 100*f*2, 100*f*3. The battery pack may include the single corner cover 400 and the double corner cover 500 to cover the corner 111 of the outermost battery modules 100*f*1, 100*f*2, 100*f*3 and the corner 211 of the processing unit 200. Additionally, the battery pack may have four wall mount brackets 810 for installation. Additionally, each of the battery modules 100*f*1, 100*f*2, 100*f*3 and the processing unit 200 may be equipped with the front cover 300** on the front surface thereof.

Figure 24:
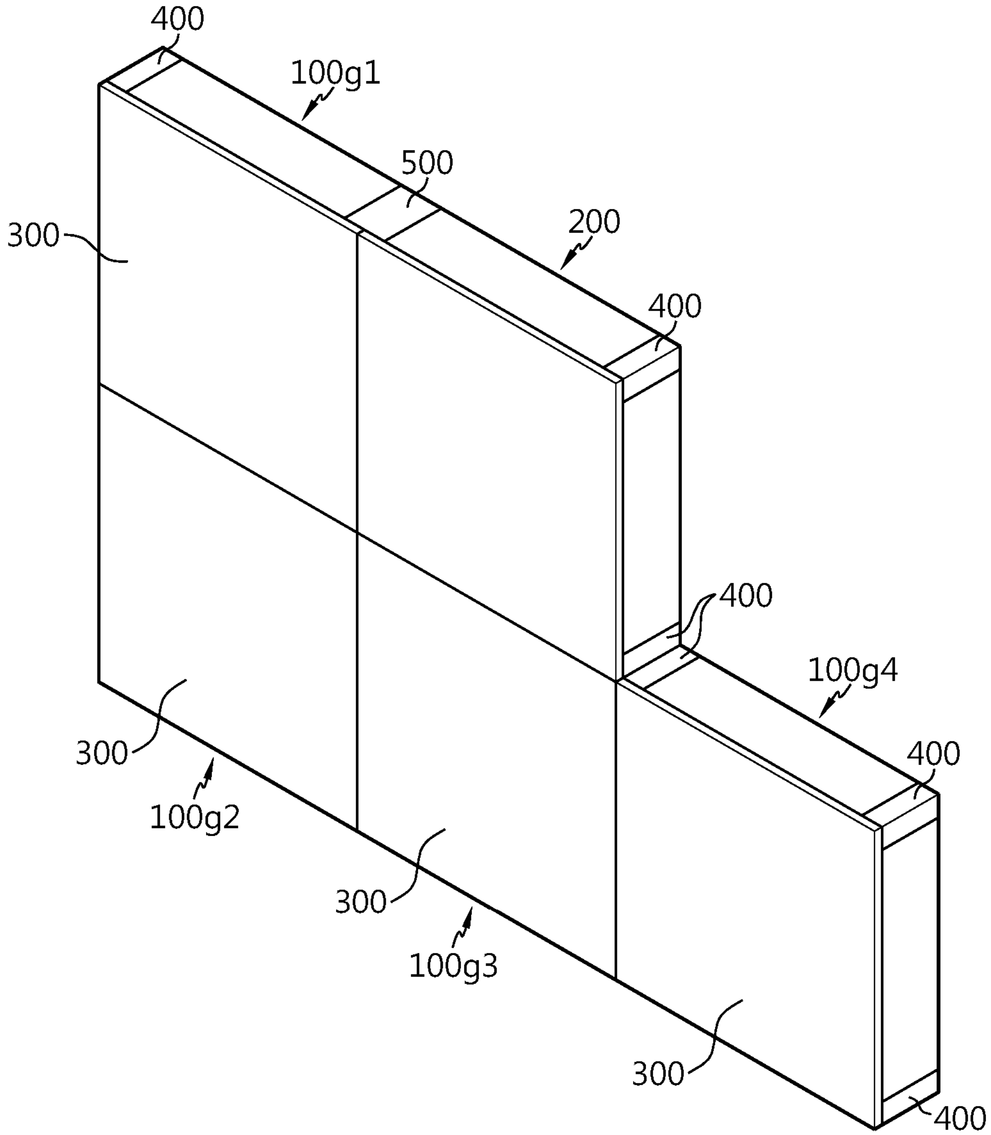
FIG. 24 is a perspective view of a battery pack according to another embodiment of the present disclosure.

FIG. 24 is a diagram of the battery pack according to another embodiment of the present disclosure. Referring to FIG. 24, the battery pack according to another embodiment of the present disclosure may include one processing unit 200 and four battery modules **100*g*1, 100*g*2, 100*g*3, 100*g*4. The processing unit 200 may control the charge/discharge of the four battery modules 100*g*1, 100*g*2, 100*g*3, 100*g*4, and detect condition information of the four battery modules 100*g*1, 100*g*2, 100*g*3, 100*g*4. The battery pack may include the single corner cover 400 and the double corner cover 500** to cover the corner 111 of the outermost battery modules 100*g*1, 100*g*2, 100*g*3, 100*g*4 and the corner 211 of the processing unit 200. Additionally, the battery pack may have five wall mount brackets 810 for installation. Additionally, each of the battery modules 100*g*1, 100*g*2, 100*g*3, 100*g*4 and the processing unit 200 may be equipped with the front cover 300 on the front surface thereof.

According to this configuration of the present disclosure, the battery pack may have a variety of changes to the number of battery modules 100 according to the required output or storage capacity. Additionally, the battery pack may have a variety of changes to the appearance according to the limitation of the space in which the battery pack will be installed.

Additionally, according to this configuration of the present disclosure, even though the battery pack changes in appearance, the coupling member 600 may be used in common to couple the battery module 100 and the processing unit 200 of the battery pack. Additionally, even though the battery pack changes in appearance, the single corner cover 400 and the double corner cover 500 may be used in common to cover the corners 111, 211 of the battery module 100 and the processing unit 200 of the battery pack. Accordingly, it is possible to improve the assembly and productivity of the battery pack.

Figure 25:
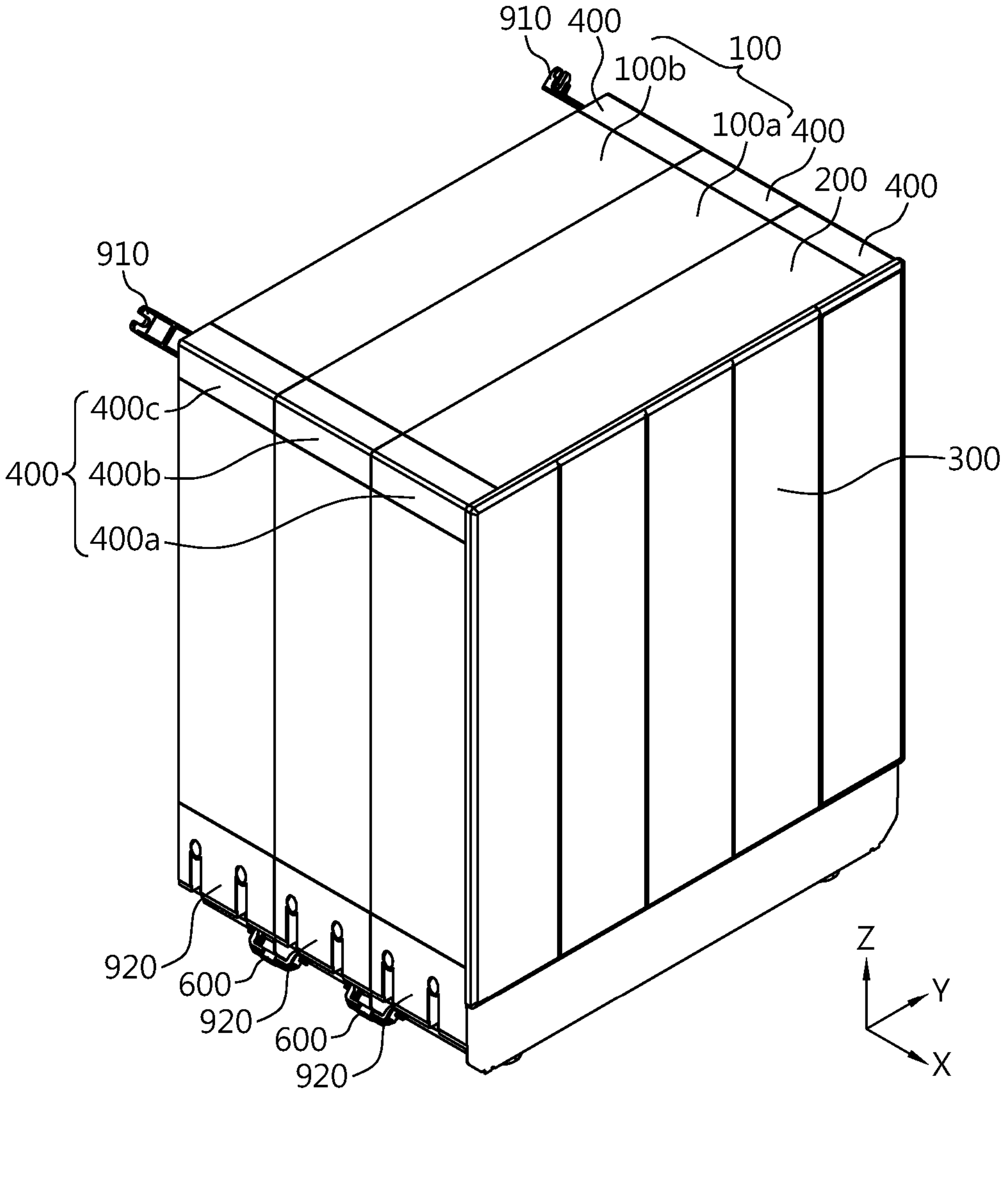
FIG. 25 is a perspective view of a battery pack according to another embodiment of the present disclosure.
Figure 26:
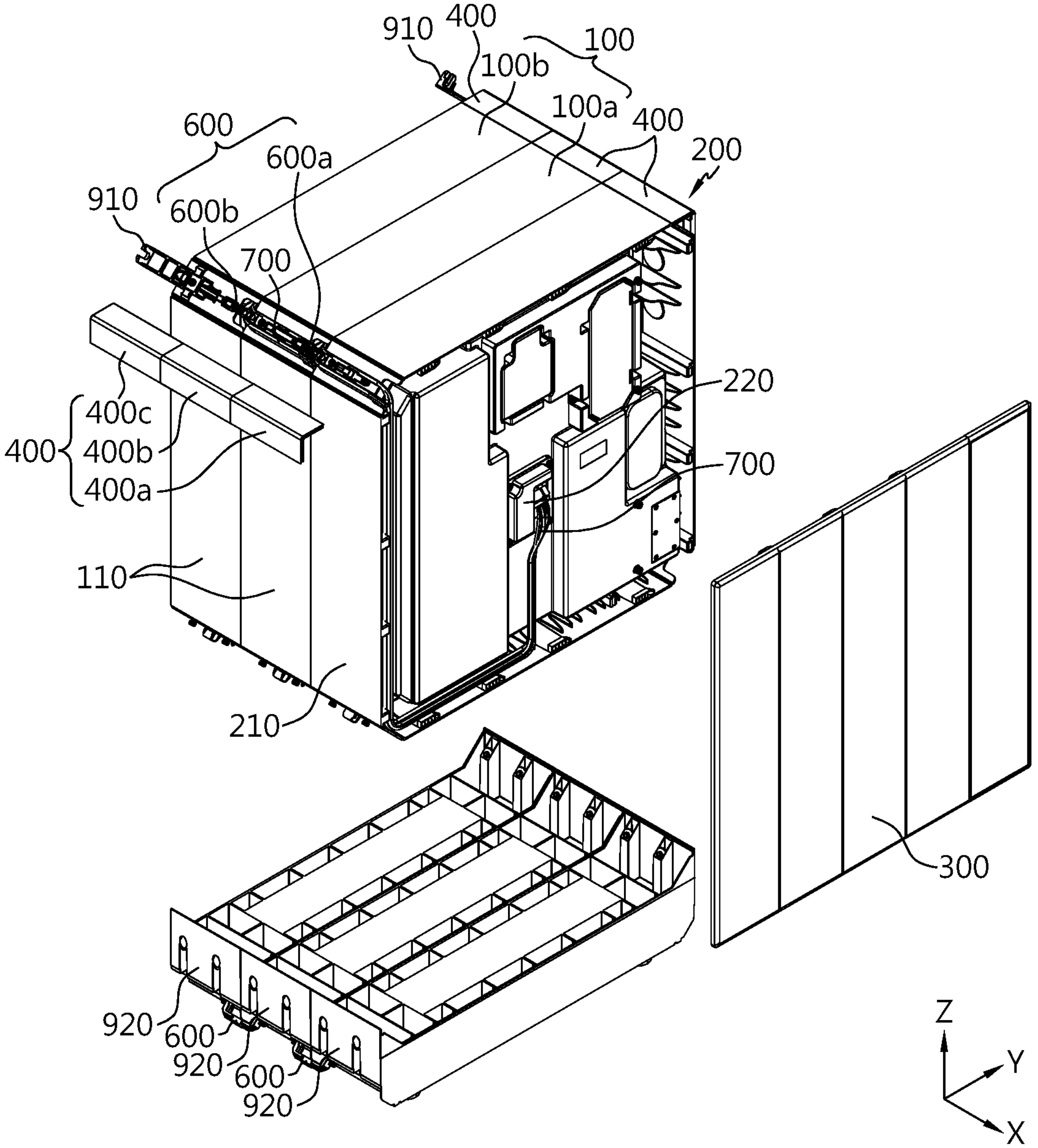
FIG. 26 is a partial exploded diagram of a battery pack according to another embodiment of the present disclosure.
Figure 27:
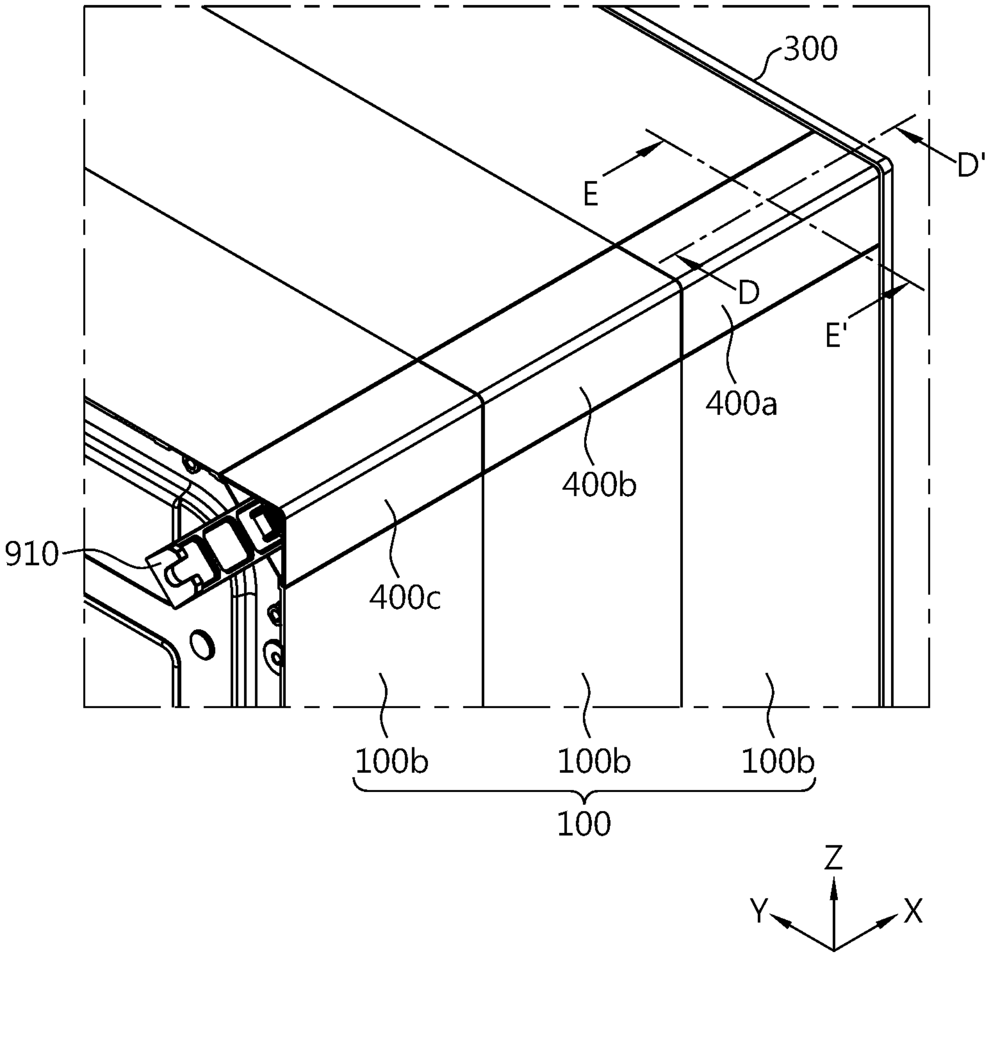
FIG. 27 is a partial enlarged diagram of a battery pack according to another embodiment of the present disclosure.

FIG. 25 is a perspective view of the battery pack according to another embodiment of the present disclosure. FIG. 26 is a partial exploded diagram of the battery pack according to another embodiment of the present disclosure. FIG. 27 is a partial enlarged diagram of the battery pack according to another embodiment of the present disclosure. Referring to FIGS. 25 to 27, the battery module 100 of the battery pack according to another embodiment of the present disclosure may be disposed at the rear of the processing unit 200.

The plurality of battery modules 100 may be stacked rearward of the processing unit 200. For example, referring to FIG. 25, the processing unit 200 and three battery modules 100 may be stacked along the front-rear direction or X-axis direction.

The battery module 100 may have the first corner 111 formed by two side plates and the first opening 112 at the first corner 111. The battery module 100 may have a cuboidal shape. The housing 110 may form an appearance of the battery module 100. The housing 110 of the battery module 100 may include a front plate and four side plates. Additionally, the four side plates of the housing 110 may form four corners 111. The four corners may be chamfered. Alternatively, the corner 111 may be a plate connecting two side plates. Alternatively, the corner 111 may be formed by two side plates. The corner 111 may have the opening 112. The opening 112 may be open to the front side or in the X-axis direction. The four corners 111 may have substantially identical shape. The battery module 100 may include a plurality of battery cells inside. In this instance, the battery cell may be a secondary battery. The battery module 100 may charge the battery cell with power or discharge the power in the battery cell. The battery pack may include a plurality of battery modules 100 according to the amount of power or output required. For example, as shown in FIG. 25, the battery pack may include two battery modules 100*a*, 100*b*.

The processing unit 200 may be disposed on the front side of the battery module 100*a* to control the charge/discharge of the battery module 100, and may have the second corner 211 adjacent to the first corner 111, and the second opening 212 at the second corner 211. The processing unit 200 may have a cuboidal shape. The housing 210 may form an appearance of the processing unit 200. The appearance or size of the processing unit 200 and the battery module 100 may be very similar or substantially identical to each other. The housing 210 of the processing unit 200 may include a front plate and four side plates. Additionally, the four side plates of the housing 210 may form four corners 211. The four corners 211 may be chamfered. Alternatively, the corner 211 may be a plate connecting two side plates. Alternatively, the corner 211 may be formed by two side plates. The corner 211 may have the opening 212. The opening 212 may be open to the front side or in the X-axis direction. The four corners 211 may have substantially identical shape. The processing unit 200 may be electrically connected, joined or coupled to the plurality of battery modules 100. The processing unit 200 may control the charge/discharge of the battery module 100. Additionally, the processing unit 200 may detect and acquire condition information of the battery module 100. The battery pack may include a plurality of processing units 200 to control the plurality of battery modules 100.

For example, the battery pack may include two battery modules 100 and one processing unit 200 as shown in FIG. 25. The two battery modules 100 and one processing unit 200 may be electrically connected to each other. The processing unit 200 may control the charge/discharge of three battery modules 100, and acquire or detect condition information of the three battery modules 100 such as voltage or temperature. Each corner 111 of the battery module 100 and each corner 211 of the processing unit 200 may have substantially identical shape.

According to this configuration of the present disclosure, the battery pack may include various combinations of at least one battery module 100 and at least one processing unit 200. Additionally, the battery module 100 and the processing unit 200 of the battery pack may have various positional relationships or connection relationships. Accordingly, it is possible to flexibly respond to various amounts of power or outputs required for the battery pack. Additionally, as the appearance of the battery pack may be adaptable, the battery pack may be free of the limitation of the space in which the battery pack is installed.

Referring to FIGS. 25 to 27, the battery pack according to another embodiment of the present disclosure may include a first stand 920 secured to the bottom of the processing unit 200, and a second stand 920 secured to the bottom of the battery module 100.

The stand 920 may be disposed in each of the processing unit 200 and the battery module 100. The plurality of stands 920 may be connected, coupled or joined to each other by the coupling member 600.

According to this configuration of the present disclosure, the stand 920 may increase the height of the battery pack. In case where the battery pack is installed outdoors or on the ground, the battery pack may be damaged by rain. The battery pack may include the stand 920 to protect the battery module 100 or the processing unit 200.

Figure 28:
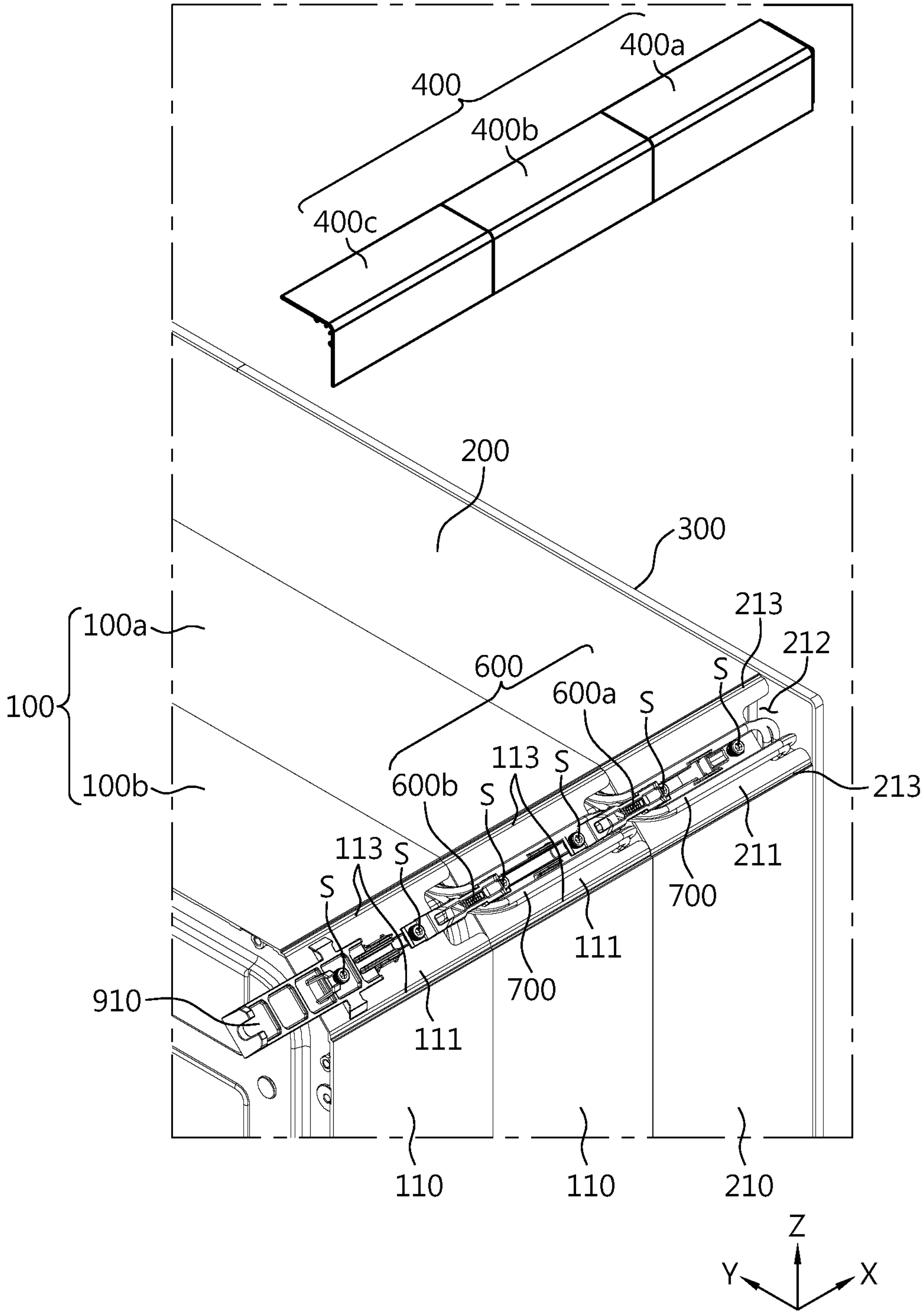
FIG. 28 is a partial exploded enlarged diagram of a battery pack according to another embodiment of the present disclosure.

FIG. 28 is a partial exploded enlarged diagram of the battery pack according to another embodiment of the present disclosure. Referring to FIGS. 26 to 28, the battery pack according to another embodiment of the present disclosure may include the first corner cover 400 that is secured to the coupling member 600 and covers at least one of the corner 111 of the battery module 100 to which the coupling member 600 is secured or the corner 211 of the processing unit 200 to which the coupling member 600 is secured.

The corner cover 400 may be coupled to the corner 211 of the processing unit 200. Additionally, the corner cover 400 may cover the opening 212 of the processing unit 200. The corner cover 400 may be referred to as a single corner cover 400. The single corner cover 400 may be configured to be coupled to any of the four corners 111 of the battery module 100 and the four corners 211 of the processing unit 200.

The cable 700 may electrically connect the battery module 100 to the processing unit 200. Additionally, the cable 700 may electrically connect two battery modules 100. Additionally, in case where the battery pack includes a plurality of processing units 200, the cable 700 may electrically connect two processing units 200. A plurality of cables 700 may be included. The cable 700 may convey the power or a signal. The at least one battery module 100 and the at least one processing unit 200 of the battery pack may be arranged in various patterns. The cable 700 may be configured to pass through the openings 112, 212 at the corners 111, 211 disposed at a location at which it is easy to electrically connect the battery module 100 to the processing unit 200. The cable 700 may pass through the openings 112, 212 at the corners 111, 211 of any one of the battery module 100 and the processing unit 200 and then the openings 112, 212 at the corners 111, 211 of the other one.

The single corner cover 400 may cover the cable 700. The cable 700 and the openings 112, 212 may be covered by the single corner cover 400.

The plurality of battery modules 100 may be included. The first battery module **100*a* may be disposed at the rear of the processing unit 200. The second battery module 100*b* may be disposed at the rear of the first battery module 100*a*. The coupling member 600*a* may couple the processing unit 200 to the first battery module 100*a*. Additionally, the coupling member 600*b* may couple the first battery module 100*a* to the second battery module 100*b*. One side and the other side of the coupling member 600 may be secured to the corners 111, 211 by the fastening member S. The coupling member 600 may be configured to be secured to any of the four corners of the battery module 100 and the four corners of the processing unit 200**.

For example, referring to FIG. 28, one side of the coupling member **600*a* may be secured to the corner 211 of the processing unit 200, and the other side may be secured to the corner 111 of the first battery module 100*a*. Additionally, one side of the coupling member 600*b* may be secured to the corner 111 of the first battery module 100*a*, and the other side may be secured to the corner 111 of the second battery module 100*b***.

According to this configuration of the present disclosure, the single corner cover 400 may prevent the infiltration of impurities into the battery pack. Accordingly, it is possible to improve the safety and life of the battery pack.

Referring to FIGS. 27 and 28, the battery pack according to another embodiment of the present disclosure may include the front cover 300 that is disposed on the front surface of the processing unit 200 and covers the front side of the corner cover 400.

The front cover 300 may be disposed on the front surface of the processing unit 200. Alternatively, the front cover 300 may be secured or coupled to the front plate or the front surface of the processing unit 200. The front cover 300 may have a larger area than the front surface or the front plate of the processing unit 200. The processing unit 200 may have the port 220 on the front surface or the front plate. The cable 700 may be connected to the port 220. The processing unit 200 may be electrically connected to the adjacent battery module 100 or another processing unit 200 through the port 220. The front cover 300 may cover the port 220 and the cable 700 connected to the port 120.

Additionally, the front cover 300 may cover the front side of the single corner cover 400. The front cover 300 may cover the space between the single corner cover 400 and the corner 211 of the processing unit 200.

According to this configuration of the present disclosure, the front cover 300 may cover the gap between the single corner cover 400 and the corner 211 of the processing unit 200 to prevent the infiltration of impurities. Accordingly, it is possible to improve the safety and life of the battery pack.

Figure 29:
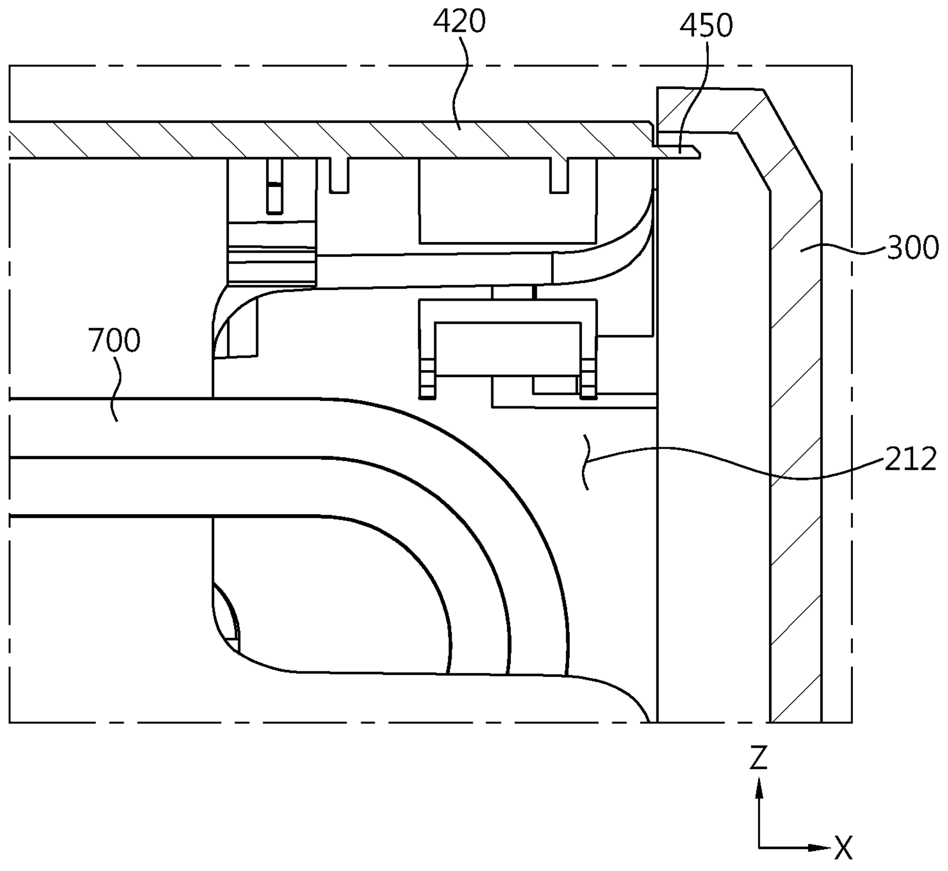
FIG. 29 is a partial cross-sectional view of FIG. 27, taken along the line D-D'.

FIG. 29 is a partial cross-sectional view of FIG. 27, taken along the line D-D'. Referring to FIG. 29, the corner cover 400 of the battery pack according to another embodiment of the present disclosure may include the protruding portion 450 that protrudes forward and is inserted into the front cover 300.

The single corner cover 400 may include the protruding portion 450 that protrudes forward. The protruding portion 450 may be formed over the first part 410 and the second part 420.

The front cover 300 may form a space. The protruding portion 450 may be inserted into the space formed by the front cover 300. Alternatively, the protruding portion 450 may be inserted into the front cover 300.

According to this configuration of the present disclosure, the protruding portion 450 may cover the gap between the front cover 300 and the single corner cover 400 to prevent the infiltration of impurities into the gap between the front cover 300 and the single corner cover 400. Accordingly, it is possible to improve the safety and life of the battery pack.

Figure 31:
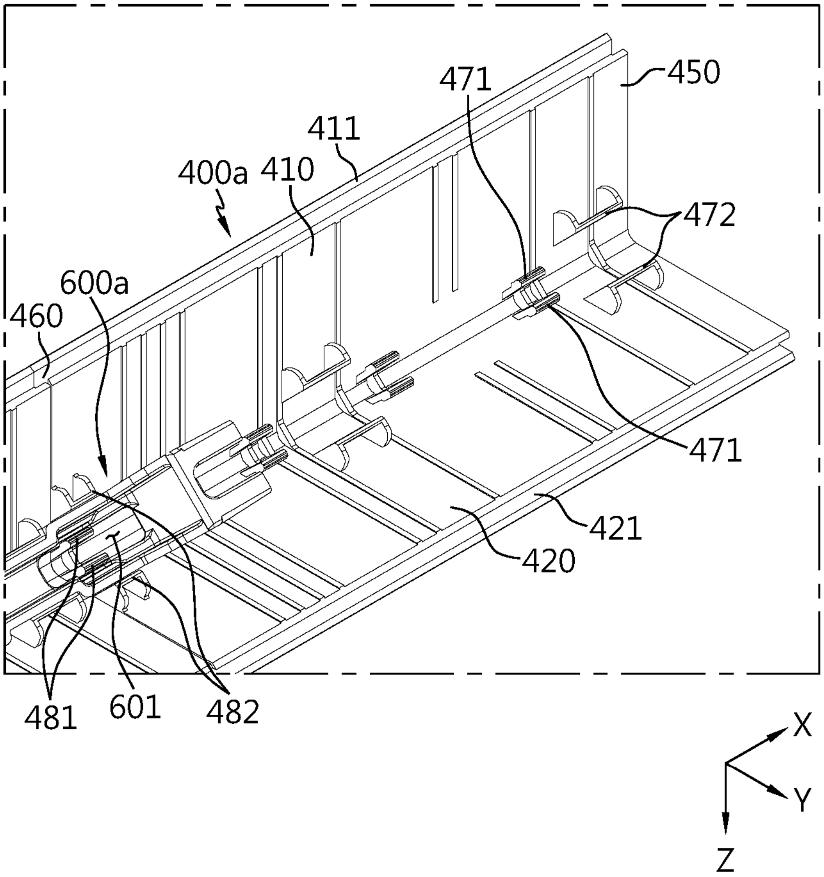
FIGS. 31 to 33 are diagrams of a corner cover of a battery pack according to another embodiment of the present disclosure.

FIG. 31 is a diagram of the corner cover 400 of the battery pack according to another embodiment of the present disclosure. Referring to FIGS. 29 and 31, the corner cover 400 according to another embodiment of the present disclosure may be coupled to the coupling member 600 slidably movably in the front-rear direction. The single corner cover 400 may slidably move and come into (close) contact with the front cover 300. The protruding portion 450 of the single corner cover 400 may be inserted into the front cover 300.

According to this configuration of the present disclosure, the battery module 100 and the processing unit 200 may have the openings 112, 212 for connection to an external configuration, and the inside may be damaged by infiltration of impurities in case where the openings 112, 212 are exposed. The single corner cover 400 may be slidably movably coupled to the coupling member to effectively prevent the infiltration of impurities into the battery pack. Accordingly, it is possible to protect the inside of the battery module 100 or the processing unit 200 and improve the safety and life of the battery pack.

Figure 30:
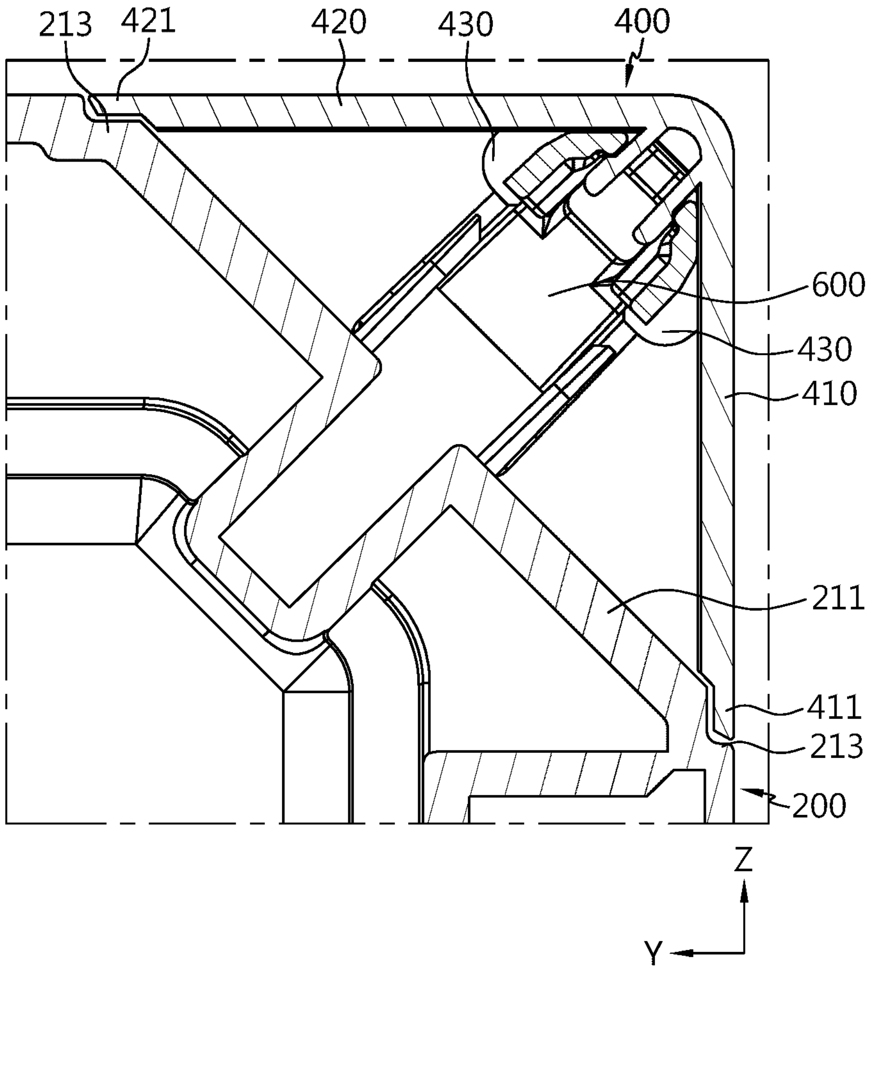
FIG. 30 is a partial cross-sectional view of FIG. 27, taken along the line E-E'.

FIG. 30 is a partial cross-sectional view of FIG. 27, taken along the line E-E'. Referring to FIG. 30, the single corner cover 400 of the battery pack according to another embodiment of the present disclosure may include the seating portion 411 along the edge of the first part 410. Additionally, the single corner cover 400 may include the seating portion 420 along edge of the second part 420. The seating portions 411, 421 of the single corner cover 400 may be seated on the step portion 213 of the corner 211. The step portion 213 may support the seating portions 411, 421 of the single corner cover 400. Additionally, the single corner cover 400 may cover the opening 212 of the corner 211.

According to this configuration of the present disclosure, the single corner cover 400 may be seated on the first step portion 113 and the second step portion 213 to maintain stable coupling with the battery module 100 or the processing unit 200. Accordingly, it is possible to improve the stability of the battery pack.

Referring to FIG. 31, the corner cover 400*a* according to another embodiment of the present disclosure may include hooks 471, 481 on the inner surface, and the hooks 471, 481 may be coupled to the coupling member 600*a*. The single corner cover 400*a* may have a bent plate shape. The single corner cover 400*a* may include the first part 410 and the second part 420. The first part 410 and the second part 420 may form the bent plate shape. For example, the first part 410 and the second part 420 may be vertically connected to each other.

The single corner cover 400*a* may include a first guide 482 and the first hook 481 on the inner surface. A pair of first guides 482 may be included. A pair of first hooks 481 may be included. Each of the pair of first guides 482 may be disposed in each of the first part 410 and the second part 420. Each of the pair of first hooks 481 may be disposed in each of the first part 410 and the second part 420.

The single corner cover 400*a* may include a second guide 472 and the second hook 471 on the inner surface. A pair of second guides 472 may be included. A pair of second hooks 471 may be included. Each of the pair of second guides 472 may be disposed in each of the first part 410 and the second part 420. Each of the pair of second hooks 471 may be disposed in each of the first part 410 and the second part 420.

The first hook 481 may be secured to the coupling member 600*a*. The first hook 481 may be secured to the hole 601 of the coupling member 600*a*. The coupling member 600*a* may have the pair of holes 601. The pair of first hooks 481 may be secured to one hole 601. The coupling member 600*a* may be disposed between the pair of first guides 482. The single corner cover 400 may be hook-coupled to the coupling member 600*a* and slidably move in the front-rear direction or X-axis direction. The hole 601 may be formed in the shape of a long hole along which the first guide 482 may slidably move. The first guide 482 may guide the single corner cover 400*a* to slidably move along the coupling member 600*a*.

According to this configuration of the present disclosure, the single corner cover 400*a* may be easily hook-coupled to the coupling member 600*a* without any fastening member. Accordingly, it is possible to improve the assembly and productivity of the battery pack.

Figure 32:
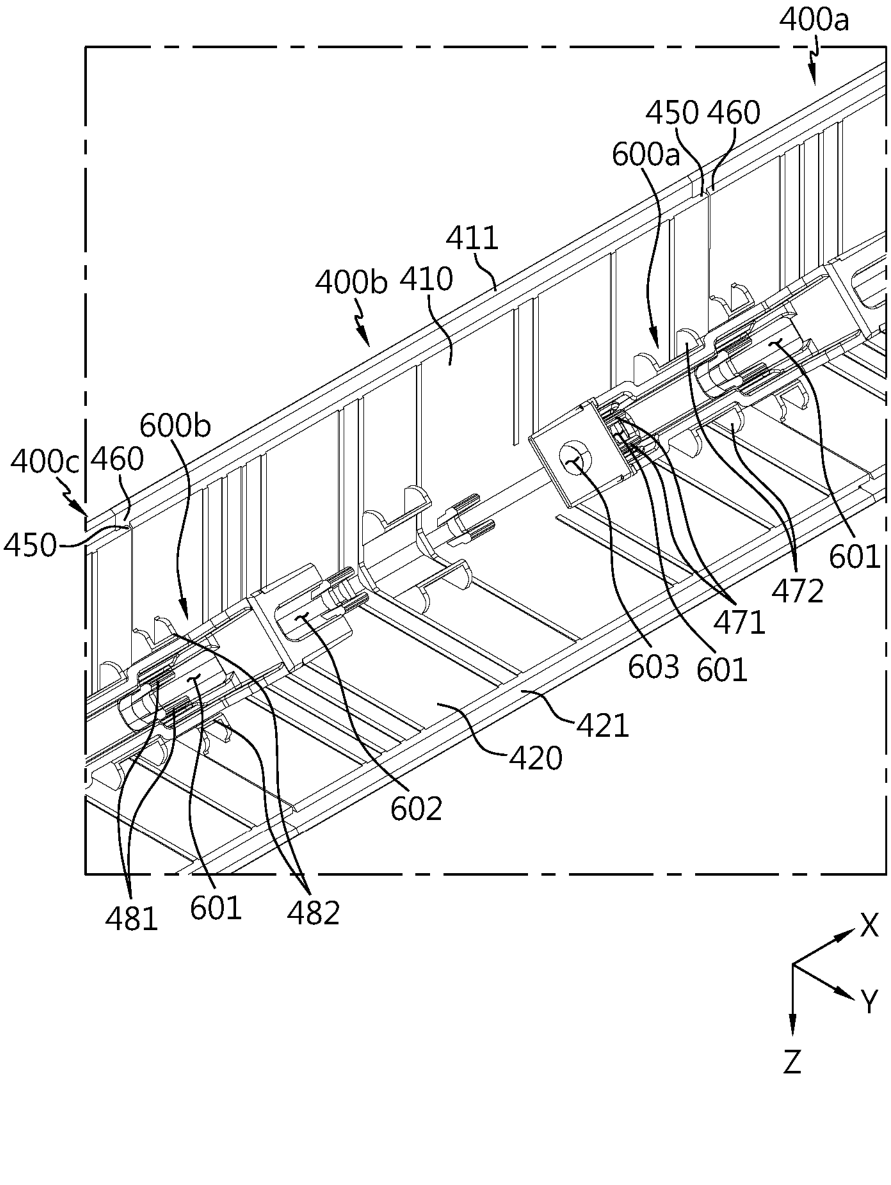

FIG. 32 is a diagram of the corner cover 400*b* of the battery pack according to another embodiment of the present disclosure. Referring to FIG. 32, the corner cover 400*b* according to another embodiment of the present disclosure may include the hooks 471, 481 on the inner surface, and the hooks 471, 481 may be coupled to the coupling members 600*a*, 600*b*.

The second hook 471 may be secured to the coupling member 600*b*. The second hook 471 may be secured to the hole 601 of the coupling member 600*a*. The coupling member 600*a* may have the pair of holes 601. The pair of second hooks 471 may be secured to one hole 601. The coupling member 600*a* may be disposed between the pair of second guides 472. The single corner cover 400*b* may be hook-coupled to the coupling member 600*a*, and slidably move in the front-rear direction or X-axis direction. The hole 601 may be formed in the shape of a long hole, along which the second guide 472 may slidably move. The second guide 472 may guide the single corner cover 400*b* to slidably move along the coupling member 600*a*.

The coupling member 600*a* may have holes 602, 603 on one side and the other side. The coupling member 600 may be secured to the corners 111, 211 by the fastening member S passing through the holes 602, 603. The hole 602 on one side may be open to the front side or in the X-axis direction. Due to this shape, the coupling member 600 may be easily secured to the corners 111, 211 in response to the tolerance occurring in the production process of the battery module 100 and the processing unit 200.

According to this configuration of the present disclosure, the single corner cover 400*b* may be easily hook-coupled to the coupling member 600*a* without any fastening member. Accordingly, it is possible to improve the assembly and productivity of the battery pack.

Referring to FIG. 32, the battery pack according to another embodiment of the present disclosure may include the second corner cover 400*b* that is secured to the coupling member 600*a*, and covers the corner 111 of the battery module 100 to which the coupling member 600*a* is secured and the corner 211 of the processing unit 200 to which the coupling member 600*a* is secured.

The first corner cover 400*a* may cover one side of the coupling member 600*a*, and the second corner cover 400*b* may cover the other side of the coupling member 600*a*. The first corner cover 400*a* and the second corner cover 400*b* may be the same component or part.

The two single corner covers 400*a*, 400*b* may be coupled to one coupling member 600*a*. Additionally, one coupling member 600*a* may be covered by the two single corner covers 400*a*, 400*b*.

According to this configuration of the present disclosure, as the two single corner covers 400*a*, 400*b* are coupled to one coupling member 600*a*, it is possible to reduce the number of components. Accordingly, it is possible to improve the assembly and productivity of the battery pack.

Referring to FIG. 32, the first corner cover of the battery pack according to another embodiment of the present disclosure may include the groove on the rear side, and the second corner cover may include the second protruding portion that protrudes forward and is inserted into the groove.

The single corner covers 400*a*, 400*b* may have the groove 460 on the rear side. The groove 460 may be formed over the first part 410 and the second part 420. The groove 460 may have a corresponding shape to the protruding portion 450. The second single corner cover 400*b* may be hook-coupled to the coupling members 600*a*, 600*b* and slidably move. By the sliding movement, the protruding portion 450 of the second single corner cover 400*b* may be inserted into the groove 460 of the first single corner cover 400*a*.

According to this configuration of the present disclosure, it is possible to prevent a gap between the adjacent single corner covers 400*a*, 400*b*. Accordingly, it is possible to prevent the infiltration of impurities into the battery pack, and improve the safety and life of the battery pack.

Referring to FIGS. 27, 28 and 32, the processing unit 200 of the battery pack according to another embodiment of the present disclosure may have the first opening 212, and the battery module 100*a* may have the second opening 112. Additionally, the battery pack may include the cable 700 passing through the first opening 212 and the second opening 112. Additionally, the second corner cover 400*b* may cover the second opening 112 and the cable 700.

The cable 700 may pass through the opening 212 of the processing unit 200 and the opening 112 of the battery module 100*a*. The single corner covers 400*a*, 400*b* may cover the corner 21 of the processing unit 200 and the corner 111 of the battery module 100*a*. Additionally, the single corner covers 400*a*, 400*b* may cover the opening 212 of the processing unit 200 and the opening 112 of the battery module 100*a*. Additionally, the single corner covers 400*a*,

400b may cover the coupling members 600a, 600b. Additionally, the single corner covers 400a, 400b may cover the cable 700.

According to this configuration of the present disclosure, the single corner covers 400a, 400b may prevent the exposure of the corners 211, 111 of the processing unit 200 or the battery module 100a and the components adjacent to the corners 211, 111, and prevent the infiltration of external impurities. Accordingly, it is possible to improve the safety and life of the battery pack.

Figure 33:
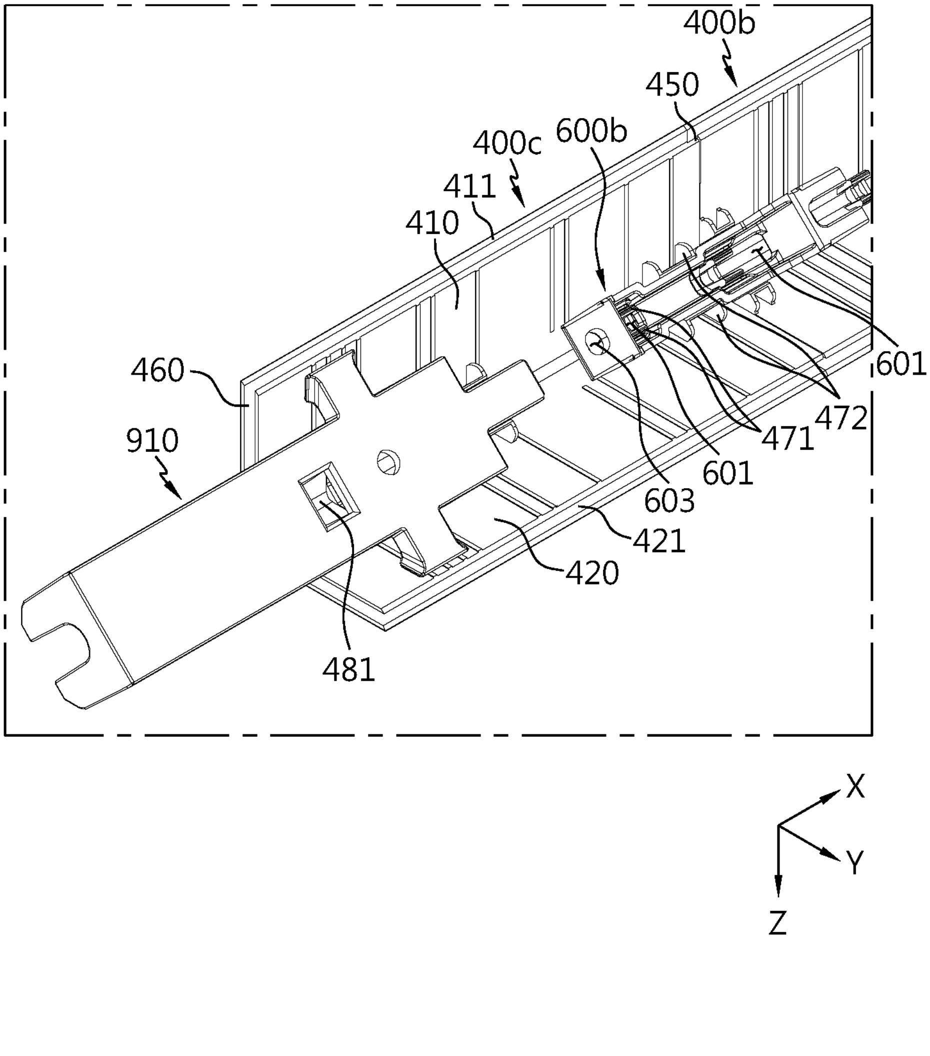
Figure 34:
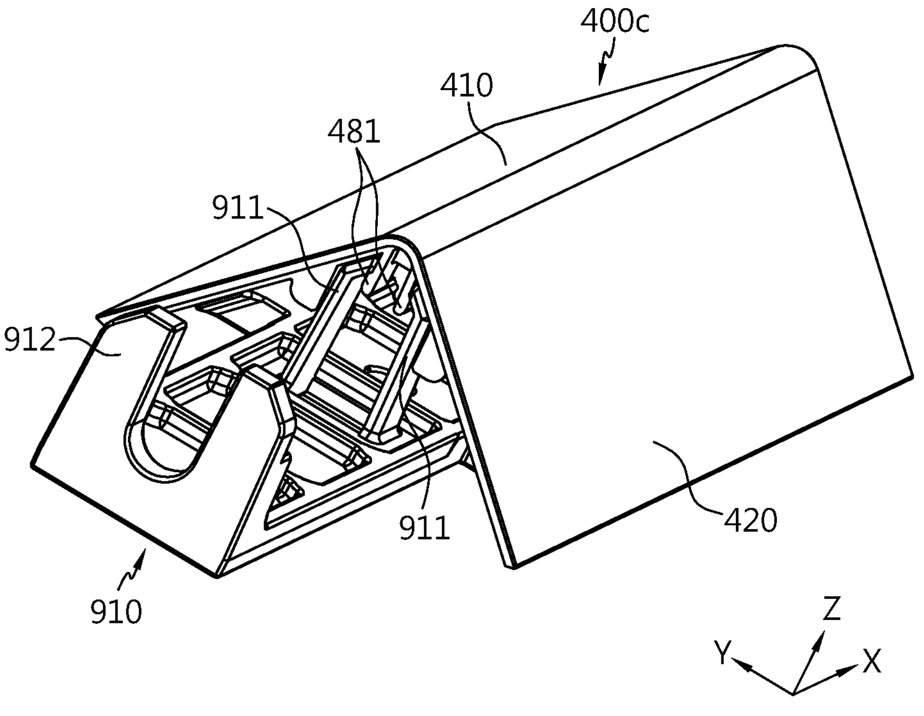
FIG. 34 is a diagram of a corner cover and an installation bracket of a battery pack according to another embodiment of the present disclosure.

FIG. 33 is a diagram of the corner cover 400c of the battery pack according to another embodiment of the present disclosure. FIG. 34 is a diagram of the corner cover 400c and an installation bracket 910 of the battery pack according to another embodiment of the present disclosure. Referring to FIGS. 28, 33 and 34, the battery pack according to another embodiment of the present disclosure may include the installation bracket 910. The installation bracket 910 may be secured to the cover 111 of the battery module 100b by the fastening member S. The installation bracket 910 may secure the battery pack to the structure such as a wall.

The installation bracket 910 may include a coupling portion 911. The hook 481 of the single corner cover 400c may be coupled to the coupling portion 911. The coupling portion 911 may be disposed between the guides 482 of the single corner cover 400c. Additionally, the single corner cover 400c may cover at least part of the installation bracket 910.

Figure 35:
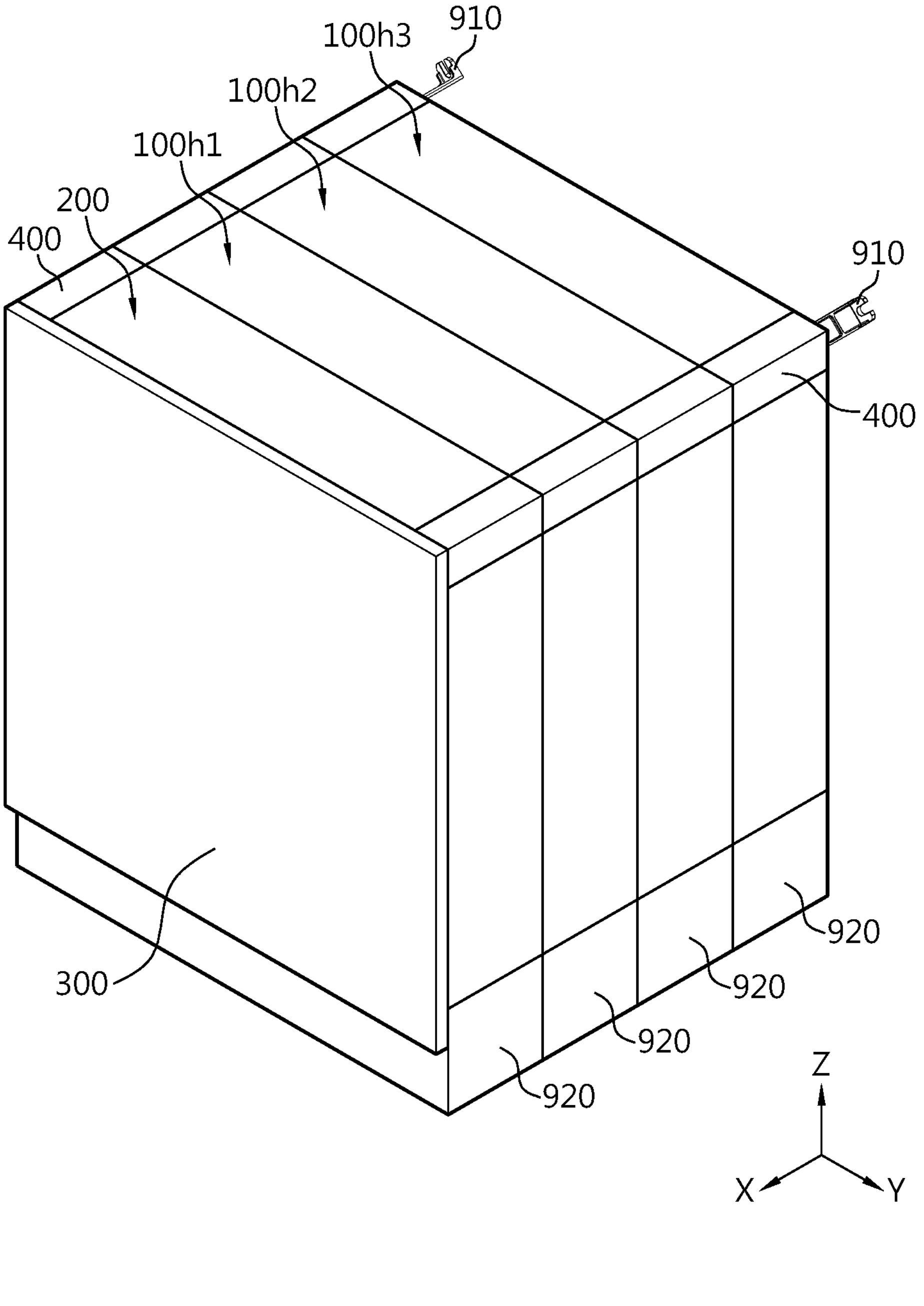
FIG. 35 is a perspective view of a battery pack according to another embodiment of the present disclosure.

FIG. 35 is a perspective view of the battery pack according to another embodiment of the present disclosure. Referring to FIG. 35, the battery pack according to another embodiment of the present disclosure may include one processing unit 200 and three battery modules 100h1, 100h2, 100h3. The processing unit 200 may control the charge/discharge of the three battery modules 100h1, 100h2, 100h3, and detect condition information of the three battery modules 100h1, 100h2, 100h3. The battery pack may include the single corner cover 400 to cover the corner 111 of the outermost battery modules 100h1, 100h2, 100h3 and the corner 211 of the processing unit 200. Additionally, the battery pack may have two installation brackets 910 for installation. Additionally, the processing unit 200 may be equipped with the front cover 300 on the front surface thereof.

Figure 36:
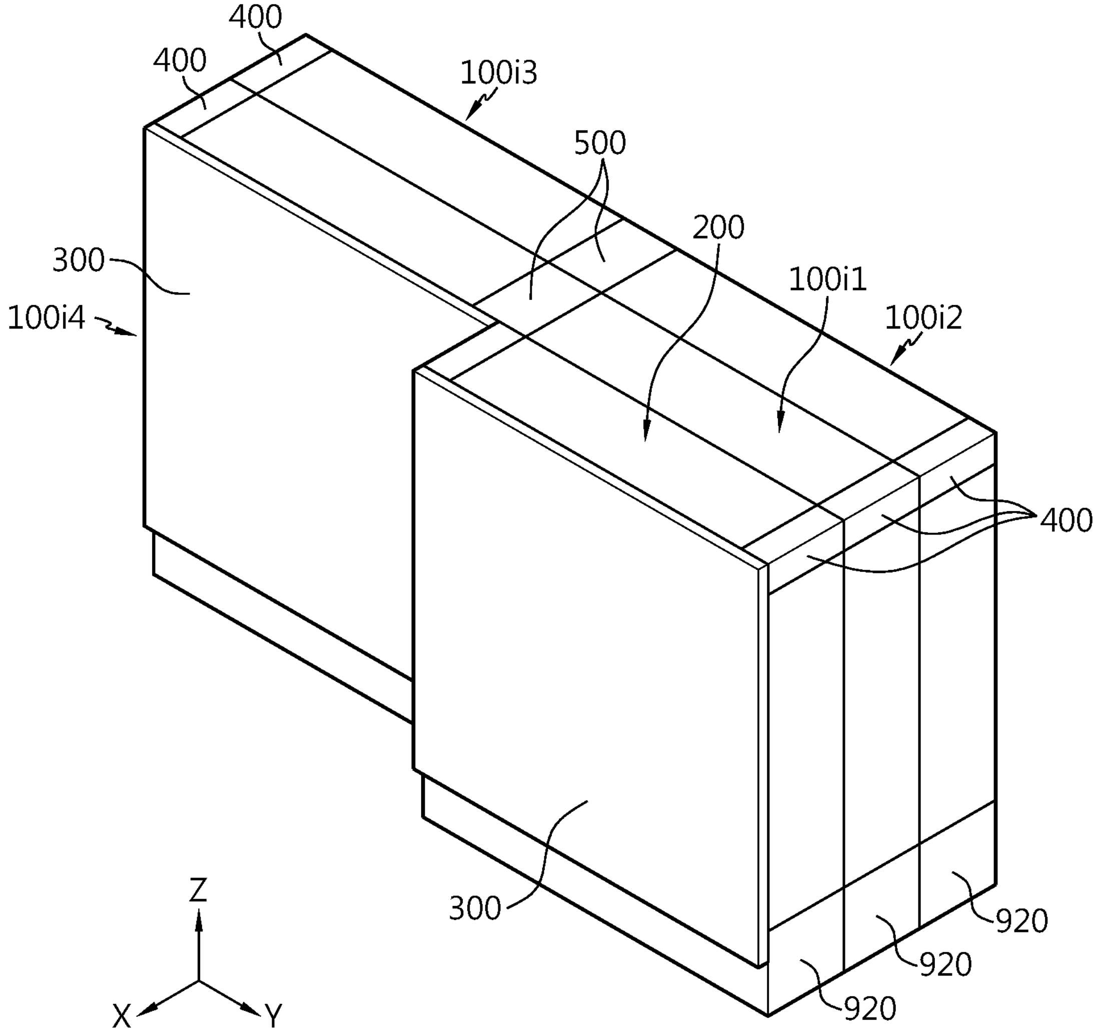
FIG. 36 is a perspective view of a battery pack according to another embodiment of the present disclosure.

FIG. 36 is a diagram of the battery pack according to another embodiment of the present disclosure. Referring to FIG. 36, the battery pack according to another embodiment of the present disclosure may include one processing unit 200 and four battery modules 100i1, 100i2, 100i3, 100i4. The processing unit 200 may control the charge/discharge of the four battery modules 100i1, 100i2, 100i3, 100i4, and detect condition information of the four battery modules 100i1, 100i2, 100i3, 100i4. The battery pack may include the single corner cover 400 and the double corner cover 500 to cover the corner 111 of the outermost battery modules 100i1, 100i2, 100i3, 100i4 and the corner 211 of the processing unit 200. Additionally, the battery pack may have two installation brackets 910 for installation. Additionally, each of the processing unit 200 and the battery module 100i4 may be equipped with the front cover 300 on the front surface thereof.

Figure 37:
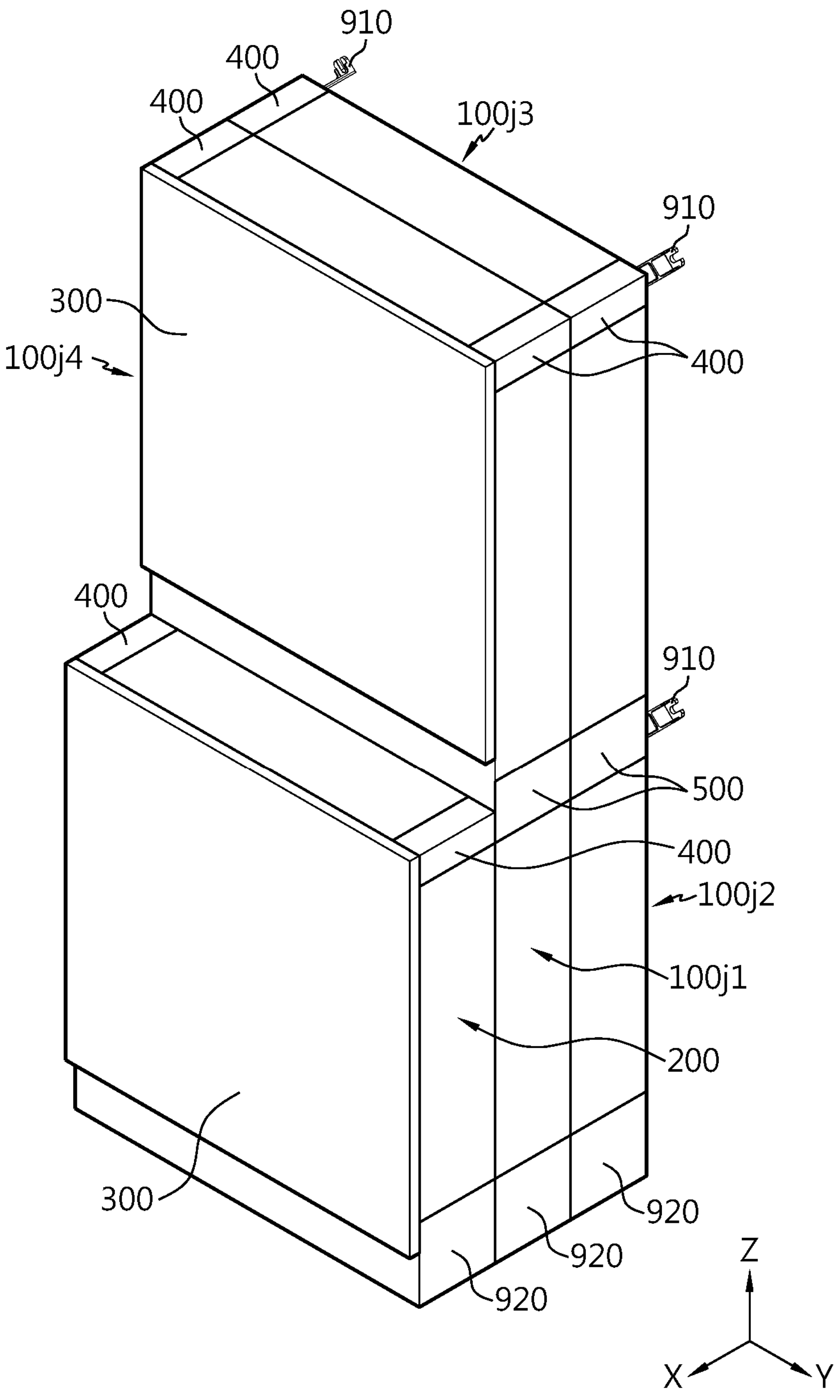
FIG. 37 is a perspective view of a battery pack according to another embodiment of the present disclosure.

FIG. 37 is a diagram of the battery pack according to another embodiment of the present disclosure. Referring to FIG. 37, the battery pack according to another embodiment of the present disclosure may include one processing unit 200 and four battery modules 100j1, 100j2, 100j3, 100j4. The processing unit 200 may control the charge/discharge of the four battery modules 100j1, 100j2, 100j3, 100j4, and detect condition information of the four battery modules 100j1, 100j2, 100j3, 100j4. The battery pack may include the single corner cover 400 and the double corner cover 500 to cover the corner 111 of the outermost battery modules 100j1, 100j2, 100j3, 100j4 and the corner 211 of the processing unit 200. Additionally, the battery pack may have two installation brackets 910 for installation. Additionally, each of the processing unit 200 and the battery module 100j4 may be equipped with the front cover 300 on the front surface thereof.

Although the plurality of battery modules 100, 100a, 100b, 100a1, 100a2, 100a3, 100a4, 100b1, 100b2, 100b3, 100c1, 100c2, 100c3, 100c4, 100d1, 100d2, 100d3, 100e1, 100e2, 100f1, 100f2, 100f3, 100g1, 100g2, 100g3, 100g4, 100h1, 100h2, 100h3, 100i1, 100i2, 100i3, 100i4, 100j1, 100j2, 100j3, 100j4 is described with different reference numerals for convenience of description, they have the same structure and shape. Additionally, although the coupling members 600, 600a, 600b are described with different reference numerals for convenience of description, they have the same structure and shape. Additionally, although the single corner covers 400, 400a, 400b are described with different reference numerals for convenience of description, they have the same structure and shape.

An energy storage system according to the present disclosure includes at least one battery pack according to the present disclosure. In addition to the battery pack, the energy storage system according to the present disclosure may further include components commonly included in energy storage systems. In particular, the energy storage system according to the present disclosure may be a home energy storage system or an energy storage system for buildings used to store energy in houses or buildings.

The terms indicating directions such as upper, lower, left, right, front and rear are used herein for convenience only, and it should be obvious to those skilled in the art that these terms may be subject to change depending on the position of the stated element or an observer.

While the present disclosure has been hereinabove described with regard to a limited number of embodiments and drawings, the present disclosure is not limited thereto, and it is apparent that a variety of changes and modifications may be made by those skilled in the art within the scope of the present disclosure and the appended claims and their equivalents.

What is claimed is:

1. A battery pack, comprising:

a first battery module; and a first processor which is electrically connected to the first battery module and configured to control charge/discharge of the first battery module, wherein the first battery module has a front plate, a back plate, four sides plates and a corner plate extending between two side plates of the four side plates, the corner plate extending at a non-perpendicular angle to the two side plates, and wherein at least one of the first battery module or the first processor is configured to allow at least one additional battery module or at least one additional processor to be coupled to two or more sides of the first battery module or the first processor.

2. The battery pack according to claim 1, wherein at least one of the first battery module or the first processor is configured to allow the at least one additional battery module or the at least one additional processor to be coupled to three or more sides of the first battery module or the first processor.

3. The battery pack according to claim 1, further comprising:

a coupling member which is secured to the first battery module and the first processor.

4. The battery pack according to claim 3, wherein the coupling member is secured to the corner plate.

5. The battery pack according to claim 4, wherein the first battery module is disposed on a side of the first processor.

6. The battery pack according to claim 5, further comprising:

a first coupling bar which is secured to a back plate of the first processor;

a first wall mount bracket which is coupled to the first coupling bar;

a second coupling bar which is secured to a back plate of the first battery module; and a second wall mount bracket which is coupled to the second coupling bar.

7. The battery pack according to claim 4, wherein the first battery module is disposed on a rear side of the first processor.

8. The battery pack according to claim 7, further comprising:

a first stand which is secured to a bottom of the first processor; and a second stand which is secured to a bottom of the first battery module.

9. The battery pack according to claim 7, further comprising:

a first corner cover which is secured to the coupling member, and configured to cover at least one of the corner of the first battery module to which the coupling member is secured or the corner of the first processor to which the coupling member is secured.

10. The battery pack according to claim 9, further comprising:

a second corner cover which is secured to the coupling member, and configured to cover at least one of the corner of the first battery module to which the coupling member is secured or the corner of the first processor to which the coupling member is secured.

11. The battery pack according to claim 7, wherein the at least one additional battery module is disposed on a rear side of the first battery module.

12. The battery pack according to claim 7, wherein the first battery module is under the first processor; and wherein the at least one additional battery module is under the first battery module.

13. The battery pack according to claim 7, wherein the first battery module is attached to a first side the first processor, and wherein the at least one additional battery module comprises a second battery module attached to a second side of the first processor and a third battery module attached to a third side of the first processor.

14. The battery pack according to claim 4, wherein the corner formed by two side plates of the first battery module and the corner formed by two side plates of the first processor are chamfered corners.

15. The battery pack according to claim 1, further comprising a coupling member attached to the corner plate by a fastener at both ends of the coupling member.

16. The battery pack according to claim 1, further comprising a coupling member attached to the corner plate; and a cover attached to the first battery module, wherein the coupling member is entirely within a space between the cover and the corner plate.

17. An energy storage system comprising the battery pack according to claim 1.

* * * * *